(12) United States Patent
Ryan

(10) Patent No.: US 7,774,435 B2
(45) Date of Patent: Aug. 10, 2010

(54) SYSTEM AND METHOD FOR BATCH TUNING INTELLIGENT DEVICES

(75) Inventor: Fintan Ryan, Dublin (IE)

(73) Assignee: Oracle America, Inc., Redwood City, CA (US)

(*) Notice: Subject to any disclaimer, the term of this patent is extended or adjusted under 35 U.S.C. 154(b) by 1695 days.

(21) Appl. No.: 10/077,520

(22) Filed: Feb. 15, 2002

(65) Prior Publication Data

US 2003/0023707 A1    Jan. 30, 2003

Related U.S. Application Data

(60) Provisional application No. 60/307,960, filed on Jul. 26, 2001.

(51) Int. Cl.
  *G06F 9/445* (2006.01)
  *H04L 29/08* (2006.01)

(52) U.S. Cl. ............... 709/220; 709/200; 709/201; 709/217; 709/218; 709/219; 709/221; 709/248; 718/101

(58) Field of Classification Search .......... 709/200, 709/201, 217–221, 248; 718/101
See application file for complete search history.

(56) References Cited

U.S. PATENT DOCUMENTS

| | | | | |
|---|---|---|---|---|
| 6,068,661 | A * | 5/2000 | Shari | 703/27 |
| 6,219,701 | B1 * | 4/2001 | Hirata et al. | 709/223 |
| 6,243,737 | B1 * | 6/2001 | Flanagan et al. | 709/202 |
| 6,449,624 | B1 * | 9/2002 | Hammack et al. | 1/1 |
| 6,460,051 | B1 * | 10/2002 | LaRue et al. | 1/1 |
| 6,466,971 | B1 * | 10/2002 | Humpleman et al. | 709/220 |
| 6,549,936 | B1 * | 4/2003 | Hirabayashi | 709/205 |
| 6,581,094 | B1 * | 6/2003 | Gao | 709/220 |
| 6,643,555 | B1 * | 11/2003 | Eller et al. | 700/83 |
| 6,704,778 | B1 * | 3/2004 | Horman | 709/220 |
| 6,721,776 | B1 * | 4/2004 | Erickson et al. | 718/101 |
| 6,785,706 | B1 * | 8/2004 | Horman | 709/203 |
| 6,801,926 | B1 * | 10/2004 | Shisler et al. | 709/201 |

(Continued)

OTHER PUBLICATIONS

Loeser et al., "iWebDB—Web Site Administration based on Object-Relational Database Technology," 1999 International Database Engineering and Application Symposium, 1999, (6 Pages).

(Continued)

*Primary Examiner*—Alina N. Boutah
(74) *Attorney, Agent, or Firm*—Robert C Kowert; Meyertons, Hood, Kivlin, Kowert & Goetzel, P.C.

(57) ABSTRACT

System and method for batch-tuning multiple software components of an intelligent device. An intelligent device may include tunable components each associated with a tunable configuration file. A batch tuner may be used to generate batch configuration documents from the configuration files. The batch tuner may also be used to generate configuration files from a batch configuration document. In one embodiment, the batch configuration document and the configuration files are markup language documents. In one embodiment, an XML document type definition (DTD) may be used as the method of information exchange. In one embodiment, the batch tuner may use an API (e.g. DOM or SAX API) to access the batch configuration document and configuration files. In one embodiment, each component may be associated with an executable module conforming to the API, and the batch tuner may call the module for the component to generate the configuration file.

72 Claims, 12 Drawing Sheets

U.S. PATENT DOCUMENTS

| | | | | |
|---|---|---|---|---|
| 6,874,010 | B1* | 3/2005 | Sargent | 709/203 |
| 6,877,093 | B1* | 4/2005 | Desai et al. | 713/156 |
| 7,085,803 | B1* | 8/2006 | Shisler et al. | 709/201 |
| 7,197,749 | B2* | 3/2007 | Thornton et al. | 718/101 |
| 7,219,345 | B2* | 5/2007 | Maly et al. | 718/101 |
| 7,243,132 | B2* | 7/2007 | Choi | 709/208 |
| 2001/0054094 | A1* | 12/2001 | Hirata et al. | 709/223 |
| 2002/0026471 | A1* | 2/2002 | Bent et al. | 709/101 |
| 2002/0049693 | A1* | 4/2002 | Gase | 707/1 |
| 2002/0078130 | A1* | 6/2002 | Thornton et al. | 709/201 |
| 2002/0116477 | A1* | 8/2002 | Somashekar et al. | 709/220 |
| 2002/0120724 | A1* | 8/2002 | Kaiser et al. | 709/221 |
| 2002/0124061 | A1* | 9/2002 | Mossman | 709/220 |
| 2002/0178380 | A1* | 11/2002 | Wolf et al. | 713/201 |
| 2003/0005023 | A1* | 1/2003 | Gilbert et al. | 709/101 |
| 2003/0014479 | A1* | 1/2003 | Shafron et al. | 709/203 |
| 2003/0055862 | A1* | 3/2003 | Bhat | 709/101 |
| 2003/0110447 | A1* | 6/2003 | Froyd et al. | 715/513 |
| 2005/0108634 | A1* | 5/2005 | Sahota et al. | 715/513 |
| 2005/0154699 | A1* | 7/2005 | Lipkin et al. | 707/1 |
| 2006/0259964 | A1* | 11/2006 | Maldonado et al. | 726/16 |

OTHER PUBLICATIONS

Hunt et al., "Distributed Configuration Management via Java and the World Wide Web," University of Karlsruhe, Karlsruhe, Germany, May 1997, (14 Pages).

* cited by examiner

```
<component>
        <description> ... </description>
        <file>
                <filename>configuration file 1</filename>
                <parameter1>20</parameter1>
                <parameter2>ON</parameter2>
                <parameter3>FALSE</parameter3>
        </file>
</component>
<component>
        <description> ... </description>
        <file>
                <filename>configuration file 2</filename>
                <parameter1>128</parameter1>
                <parameter2>10011110</parameter2>
        </file>
</component>
```

*FIG. 5*

SYSTEM AND METHOD FOR BATCH TUNING INTELLIGENT DEVICES

This application claims benefit of priority to Provisional Patent Application Ser. No. 60/307,960, filed Jul. 26, 2001.

BACKGROUND OF THE INVENTION

1. Field of the Invention

This invention relates to intelligent devices such as computer systems, and more particularly to a system and method for batch-tuning multiple components of an intelligent device.

2. Description of the Related Art

Intelligent devices typically include one or more software components that are executable within the devices. Intelligent devices may include, but by no means are limited to: smart appliances, printers, personal digital assistants (PDAs), cellular/mobile phones, notebook computers, laptops, desktop computers, workstations, more powerful computer systems such as mainframes and high-end servers, even supercomputers.

Software components may include, but are not limited to, system software components including operating system software (e.g. Sun Solaris, Microsoft Windows, Windows NT, Linux, Macintosh, etc.), application software (e.g. database management, storage management, utility, etc.), and driver software for interfacing with and controlling hardware components. Hardware components may include, but are not limited to, processors, memory, firmware, storage devices, and external interfaces.

Software components often have parameters that are modifiable or "tunable" to change one or more aspects of the performance of the component. For example, a software application may have parameters that may be changed to adjust the amount of memory the application uses; using more memory may allow the application to run faster, while using less memory may allow the application to have a smaller "footprint." Another example of component parameters is system software parameters, including operating system parameters, which may be used for tuning system software including operating system software. For example, a system software parameter may specify the network address of the intelligent device. Operating system parameters may be used to adjust virtual memory allocation. Yet another example of component parameters is driver parameters that may be used to control some aspect of a hardware component, such as the default speed of a modem. Typically, the driver sets a register of the hardware component with the parameter value.

The process of setting parameters of components in intelligent devices may be referred to as "tuning." The term "tune" may include the notion of optimizing one or more components of a system for a particular environment, especially by adjusting numerical parameters designed as hooks for tuning, e.g. by changing "#define" lines in C. For example, an intelligent device may be tuned for time (fastest execution), tuned for space (least memory use), and/or tuned for configuration (most efficient use of hardware). The word "configure" may be used interchangeably with the word "tune."

Components of an intelligent device may have a corresponding configuration tool with an interface that allows various parameters used to control the component to be modified or tuned. A configuration tool may be integrated in the component or may be a stand-alone application. Typically, the various parameter values associated with a component may be maintained in one or more files that may be referred to as "configuration files." The configuration files may be stored within the intelligent device or alternatively may be stored externally to the intelligent device, e.g. on a server that is accessible by the intelligent device via a network. Any file format may be used for the configuration files so long as they are readable by the configuration tool. File formats may be public (e.g. plain text, Microsoft Word, Microsoft Excel, among others) or proprietary.

Typically, when an intelligent device is initially configured, each component's configuration file(s) will contain default values for the parameters used to tune the component. During the setup process of the intelligent device, a user may access the configuration tool for each of the components that the user desires to tune or reconfigure. The configuration tool may access the configuration file(s) for the component, and may display a portion or all of the parameters for the component. The user may then use the configuration tool to modify one or more of the parameters to "tune" the component as desired. The configuration tool may save the new parameter values to the configuration files if the user so desires. The user may repeat a similar process using the configuration tool of each of the components that the user desires to tune. The next time the component or components are initialized from the configuration file(s) (e.g. on reboot of the intelligent device), the new parameter values are read from the configuration file(s) by the component(s) and take effect to tune the component(s) as specified.

As an example, consider a system installed with Oracle, Veritas and Solaris components. Tunable parameters for this system exist in files with different types of markups, i.e./etc/system and $ORACLE_HOME/dbs/init.ora for Oracle and /etc/system for Solaris and Veritas. When first installed on a system, these applications are untuned and, as such, in most large-scale deployments, unusable. In a one-off installation, the system is tuned and then is ready for use. In large-scale implementations, there may be a plurality of systems requiring similar or identical tuned parameters.

FIG. 1 is a block diagram illustrating an exemplary intelligent device 100 and the prior art mechanism used to tune the device. Intelligent device 100 may include multiple components 102 (in this example, three components 102A, 102B and 102C are shown). These components may be hardware an/or software components as described above. At least some of the components may be tunable, and may have a corresponding configuration tool 104. The configuration tools 104 may be used to access one or more tunable configuration files 106 for the corresponding components 102. For example, component 102A is shown with corresponding configuration tool 104A, which may be used to access and modify configuration file 106A. To tune device 100, a user 150 may have to access two or more of configuration tools 104 to tune the individual configuration files 106 associated with the components 102 that the user wishes to tune. To apply the changes made in the configuration files 106, the components 102 may access the configuration files 106, for example, an application may read a configuration file 106 when restarted, or registers in a hardware component may be set to the new parameters in the configuration file when reinitialized. Some components 102 may have configuration tools 104 that may be used to apply the changed configuration file 106 to the component 102 directly (i.e. without restarting or re-initializing the component).

In the prior art, if one or more other intelligent devices need to be tuned to match a first device, to tune the one or more other devices, the user may have to repeat the accessing and entering of parameter values through each of the configuration tools 104 on each of the devices, or alternatively may transfer one or more of the configuration files 106 to the one or more other devices device. The second option may be difficult because the various configuration files 106 may be stored in diverse locations on the intelligent device 100, and may actually be in different locations on the one or more other devices. Also, one or more non-tunable parameters in the configuration files 106 may be different between the two devices, and overwriting the configuration files may unintentionally replace parameters that should not be changed. Another problem may arise if the second intelligent device does not include all of the components found in the first device, and therefore the user may have to determine the components that are and are not present.

SUMMARY OF THE INVENTION

A system and method for batch-tuning multiple software components of an intelligent device is described. An intelligent device may include one or more tunable components each associated with one or more tunable configuration files. As applications evolve, tunable parameters may come and go. Embodiments of the batch tuning mechanism allow snapshots of tunable parameters on an intelligent device to be taken and maintained, and may provide a standard mechanism for dealing with system installations, restores, etc., and as such making the overall maintenance of intelligent devices more manageable.

To tune the components, a user modifies (tunes) the configuration files. The intelligent device may also include a batch tuning mechanism (referred to as a "batch tuner") to generate new and/or modify existing batch configuration documents from a plurality of tunable configuration files on the intelligent device. The batch tuner may also include a mechanism to generate new and/or modify existing configuration files from an existing batch configuration document. In one embodiment, the batch configuration document is a markup language document. In one embodiment, the configuration files are markup language documents. In one embodiment, the markup language used is the eXtensible Markup Language (XML).

In one embodiment, the mechanism to generate a new or modify an existing batch configuration document may use one or more executable scripts written in a script language such as Perl, or alternatively in a compiled language such as Java, C or C++. Note that in some embodiments other languages besides the ones mentioned above may be used. The script may be referred to as a generator script. The generator script may, when executed, parse a portion or all of the available tunable configuration files on the intelligent device and build these into a batch configuration document. If the batch configuration document does not already exist, the generator script may create a new batch configuration document. If the batch configuration document does exist, the generator script may modify the existing batch configuration document, or alternatively may create a new version of the batch configuration document.

The batch configuration document may include markup symbols (e.g. tags) that describe the contents of the configuration files from which the batch configuration document was generated, including all applicable tunable parameters from the configuration files. In one embodiment, the batch configuration document may be divided into sections, with one section for each configuration file. Each section may describe the particular configuration file to which it is associated, including all applicable tunable parameters from the configuration file. The sections may also include name and location (e.g. directory) information for the configuration files.

In one embodiment, the mechanism to generate new or modify existing configuration files from an existing batch configuration document may include an executable tuner script written in a script language. This script may be referred to as a tuner script. The tuner script may, when executed, read a previously created batch configuration document, verify that the relevant component(s) are present in the device, edit and/or create the indicated configuration files, and optionally reboot the intelligent device if necessary. The tuner script may create a new configuration file for the component or, if the configuration file already exists, the tuner script may modify the existing file, or alternatively may create a new version of the file. If, when executing the tuner script, it is determined that a particular component that is included in the script does not exist in the intelligent device, then the section of the configuration document that tunes the configuration file(s) for the missing component may be skipped. Alternatively, the configuration files for all components as specified in the script may be modified and/or created regardless of whether the component(s) are present or not.

In one embodiment, multiple versions of batch configuration documents may be generated on an intelligent device. In other words, a user may "tune" the intelligent device for a particular configuration, generate a first batch configuration document, retune the device to a second configuration, generate a second batch configuration document, and so on to create a plurality of batch configuration documents. The user may then use the batch tuner to easily switch from one configuration to another configuration by applying a different batch configuration document. Different batch configuration documents may be used to tune a portion or all of the components on the intelligent device. Thus, the user may use different batch configuration documents to tune particular subsets of components without having to retune all components on the intelligent device.

In one embodiment of an intelligent device with a batch tuner, one or more components may not require associated configuration tools, because the batch tuner may be used in lieu of the configuration tools to create new and/or modify existing configuration files for the components.

In one embodiment, an XML document type definition (DTD) for describing a portion or all of the available tunable parameters and configuration files may be used as a standard method of information exchange in the methods described herein. In one embodiment, the batch tuner may include an interpretation layer for the XML documents which conform to the DTD. In one embodiment, the XML DTD may be used for both the configuration files and the batch configuration document. In one embodiment, the batch configuration document and the configuration files may conform to a document object model (DOM), and the batch tuner may use a DOM application programming interface (API) to access the batch configuration document and configuration files. In other embodiments, the batch tuner may use other interfaces to access the batch configuration document and configuration files, for example, SAX (Simple API for XML). In other embodiments, the configuration document and files may conform to other mechanisms that support user-defined data structures.

In one embodiment, each component may be associated with an executable module. When the batch tuner tunes a particular component, it may call the executable module for the component, which may then modify the configuration file(s) for the component using input from the batch tuner. In one embodiment, the modules may be written to conform to a standard application programming interface (API) that allows the modules to accept a document object model (DOM) tree as an input, for example, the DOM API or the SAX API.

During generating a batch configuration document from a plurality of tunable configuration files, the batch tuner may use the API (e.g. DOM or SAX API) to construct one or more DOM trees from the configuration files, where each configuration file is associated with a particular DOM tree. The DOM tree may include the parameter values for the tunable parameters in the configuration file associated with this DOM tree. The DOM tree for a configuration file may also include one or more other pieces of information about the file, including, but not limited to: a file name, location information for the file, a file description, links to one or more other configuration files that may need to be tuned in conjunction with tuning this file, and reboot/reinitialize information.

After generating a DOM tree from a tunable configuration file, relevant information from the file, including the values of tunable parameters for the component associated with the file, may be accessed from the DOM tree and written to the batch configuration document. In one embodiment, the batch configuration document conforms to an XML DTD, and the relevant information is written to the document in accordance with the XML DTD. Once all available and applicable configuration files have been processed, the generation of the batch configuration document is complete.

Although embodiments are generally described as constructing a DOM tree from the configuration files, it is noted that other data structures, including other implementations of trees, may be used in various embodiments.

During tuning the intelligent device using a batch configuration document, the batch configuration document may be parsed by the batch tuner. In one embodiment, the batch tuner may use the API (e.g. DOM or SAX API) to generate a DOM tree for each configuration file described in the configuration document. Alternatively, the batch tuner may generate a DOM tree that describes the entire batch configuration document. In this embodiment, the DOM tree may be viewed as a "grove", with one DOM tree in the grove for each configuration file. The batch tuner may then access each configuration file and apply the parameter values from the DOM tree to the configuration file.

In one embodiment, a batch configuration document may be generated on one intelligent device, transferred to a second intelligent device, and used to configure components on the second device. On the second device, a copy of the batch tuner may be used to apply the contents of the transferred batch configuration document to one or more configuration files on the device.

One embodiment may include a mechanism for batch-tuning components within two or more devices. In this embodiment, the batch tuner may be used to generate a batch configuration document from one or more configuration files on a first intelligent device, where each configuration file on the first device is associated with a component on the first device, and from one or more configuration files on a second intelligent device, where each configuration file on the second device is associated with a component on the second device. The batch tuner on the first device may then be used to tune both devices by applying the contents of the batch configuration document to the configuration files on the first and second intelligent devices. In one embodiment, a configuration document may be generated by the batch tuner on a first intelligent device from only the one or more configuration files on a second intelligent device, or from two or more other intelligent devices. The batch tuner may then be used to tune the second device by applying the contents of batch configuration document to the one or more configuration files on the second device.

In one embodiment, multiple intelligent devices coupled to a network may access one or more batch configuration documents from a server on the network. One or more batch configuration documents may be generated on one or more of the intelligent devices on the network and copied to the server. In one embodiment, one or more batch configuration documents may also be generated on the server. An intelligent device may download one or more of the batch configuration documents from the server as required. The downloaded batch configuration document may be applied by a batch tuner on the device to tune the one or more components on the intelligent device.

BRIEF DESCRIPTION OF THE DRAWINGS

FIG. 5 illustrates a batch configuration markup language document generated from tunable configuration files according to one embodiment;

Figure 1:
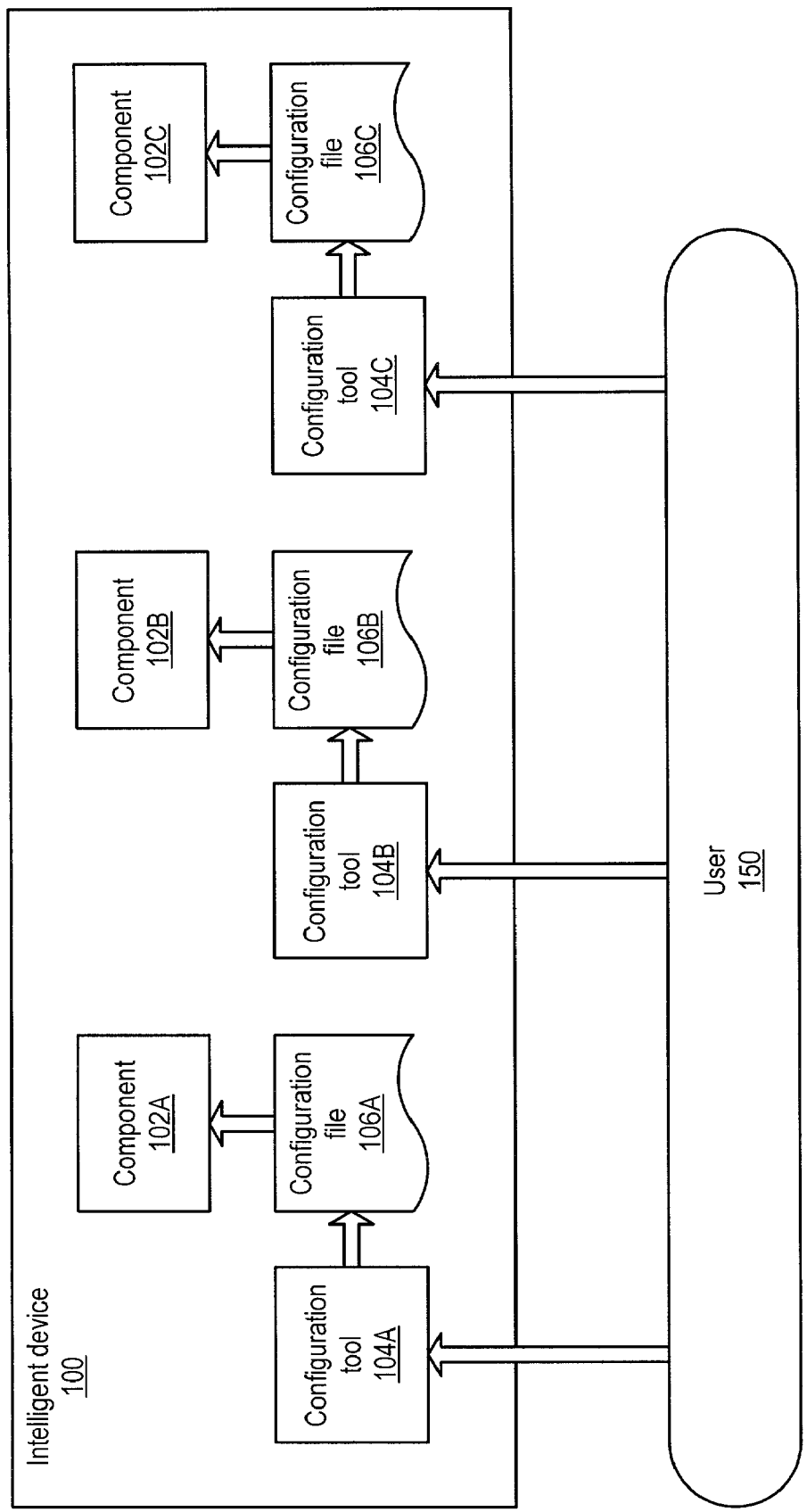
FIG. 1 illustrates a prior art intelligent device with multiple components and configuration methods.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a system and method for batch-tuning one or more components of intelligent devices are described. An intelligent device may include tunable components each associated with one or more tunable configuration files. Intelligent devices typically include one or more software components that are executable within the devices. Intelligent devices may include, but by no means are limited to: smart appliances, printers, personal digital assistants (PDAs), cellular/mobile phones, notebook computers, laptops, desktop computers, workstations, servers (e.g. Web and application servers), more powerful computer systems such as mainframes and high-end servers, even supercomputers. Software components may include, but are not limited to, system software including operating system software (e.g. Sun Solaris, Microsoft Windows, Windows NT, Linux, Macintosh, etc.), application software (e.g. database management, storage management, utility, etc.), and driver software for interfacing with and controlling hardware components. Intelligent devices typically include one or more hardware components such as processors, memory, firmware, storage devices, and external interfaces.

As applications evolve, tunable parameters may come and go. Embodiments of the batch tuning mechanism allow snapshots of tunable parameters on an intelligent device to be taken and maintained, and may provide a standard mechanism for dealing with system installations, restores, etc., and as such making the overall maintenance of intelligent devices more manageable. Possible implementations of embodiments of the batch tuning mechanism include, but are not limited to, large-scale deployments of software components, support (e.g. when a problem is logged, a snapshot may be generated using the batch tuning mechanism and provided with the problem information), and in Quality Assurance (QA) (e.g. for the replication of tests). For example, in QA, snapshots may be made of a plurality of alternative configurations, and may be applied to the system under test for testing under the different configurations.

Figure 2:
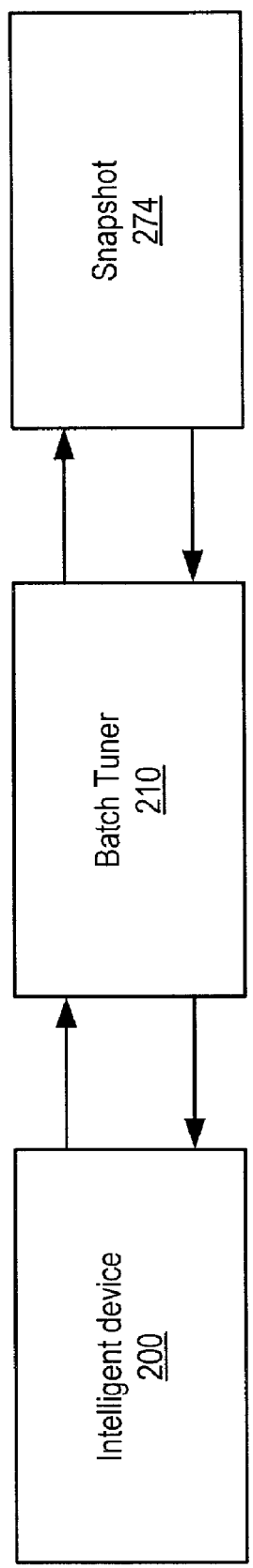
FIG. 2 illustrates a batch tuning mechanism for use in generating a snapshot of a tuned intelligent device or system according to one embodiment.

As illustrated in FIG. 2, a batch tuning mechanism (referred to as a batch tuner 210) may be used to generate one or more batch configuration documents, which may be referred to as taking a "snapshot" 274, from the tunable information on an intelligent device 200. In one embodiment, the snapshot 274 may include one or more markup language documents. In one embodiment, the documents may be eXtensible Markup Language (XML) documents. Note that other embodiments may use other document formats. The batch tuner 210 may also be used to generate configuration files from the snapshot 274; this process may be referred to as "tuning". The tuning may be performed on the original intelligent device 200 (e.g. during a restore) or alternatively on other intelligent devices (e.g. during installation of multiple systems).

Figure 3:
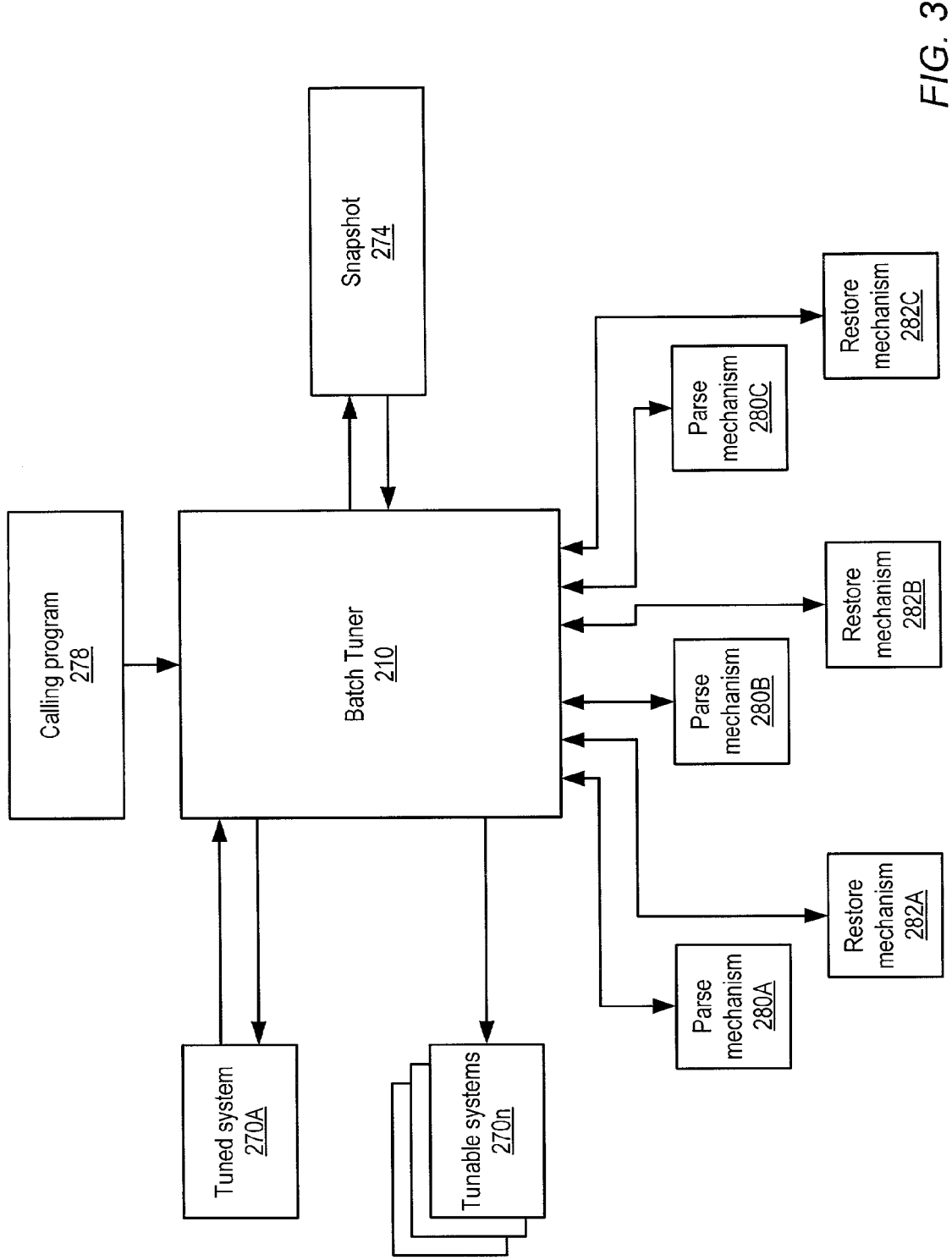
FIG. 3 illustrates an exemplary batch tuning mechanism for use in generating a snapshot of a tuned system and for tuning other installed systems using the snapshot according to one embodiment.

FIG. 3 illustrates an exemplary batch tuning mechanism according to one embodiment. As an example, and as such not intended to be limiting, consider a system 270A installed with Oracle, Veritas and Solaris components. Tunable parameters for this system may be included in files with different types of markups, i.e./etc/system and $ORACLE_HOME/dbs/init.ora for Oracle and /etc/system for Solaris and Veritas. When first installed on a system, these applications are untuned and, as such, in most large-scale deployments, unusable. In a one-off installation, the system may be tuned to prepare the system for use. In large-scale implementations, there may be a plurality of systems to be installed each requiring similar or identical tuned parameters. Using embodiments of the batch tuning mechanism as described herein, a "snapshot" 274 may be taken of tunable parameters on one system, e.g. system 270A of FIG. 3. In one embodiment, these parameters may be "marked up" using a markup language (e.g. XML). In one embodiment, for each tunable file, a parser mechanism 280 may be generated which "marks up" the parameters into a markup language file(s), for example as defined by a Data Type Definition (DTD). A plurality of systems 270n may be installed, and then the batch tuning mechanism may be used to filter the marked-up information and "tune" the relevant files on each installed system. In one embodiment, a restore mechanism 282 may also be generated for reading the markup file(s) and editing the relevant files on installed systems 270n.

In the above example, the classes myOracle, myVeritas and mySolaris may each include a parse and a restore method. In one embodiment, both of these methods may be available to a controlling method via a design pattern such as the visitor pattern. In software development, a design pattern is a written document that describes a general solution to a design problem that recurs repeatedly in many projects. In object-oriented programming, a design pattern may include the description of certain objects and object classes to be used, along with their attributes and dependencies, and the general approach to how to solve the problem. A design pattern allows the adding of new operations to composite class hierarchies without modifying the text of either the composite class or its variants.

The batch tuner 210 may be called (e.g. by a calling program 278, which in one embodiment may be controlled by user input) and provided with information describing what information is to be gathered (e.g. Oracle and Solaris but not Veritas). The batch tuning mechanism may then use a parse method to create a snapshot 274 of the software component(s). On the "new" system, a restore method may be executed that reads the markup language snapshot(s), loads the relevant classes (using a design pattern such as the visitor pattern) and edits the relevant file(s).

Figure 4:
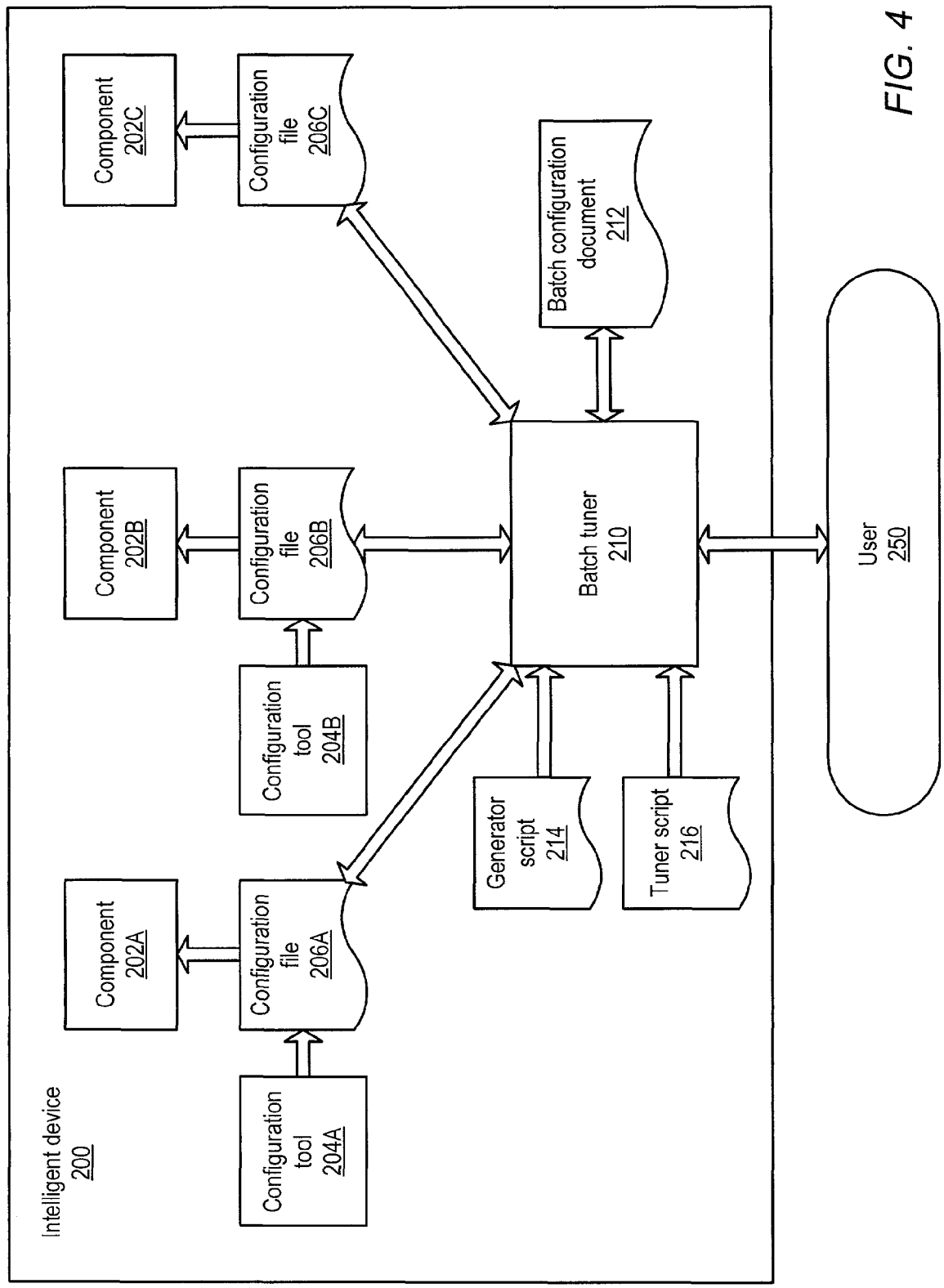
FIG. 4 illustrates an intelligent device with a mechanism for batch-tuning multiple components within the device according to one embodiment.

FIG. 4 is a block diagram of an intelligent device and illustrates a mechanism for batch-tuning multiple software components within the device according to one embodiment. Intelligent device 200 may include multiple software components 202 (in this example, three components 202A, 202B and 202C are shown). At least some of the components may be tunable, and may each have a corresponding configuration tool 204. The configuration tools 204 may be used to access one or more tunable configuration files 206 for the corresponding components 202. For example, component 202A is shown with corresponding configuration tool 204A, which may be used to access and modify configuration file 206A. To tune device 200, a user 250 may access one or more of configuration tools 204 to tune the individual configuration files 206 associated with the components 202 that the user wishes to tune. To apply the changes made in the configuration files 206, the components 202 may access the configuration files 206. For example, an application may read a configuration file 106 when restarted. In another example, a software driver may read a configuration file 206 to set registers in a hardware component to the parameters in the configuration file 206 during initialization of the hardware component.

Intelligent device 200 may also include batch tuner 210. Batch tuner 210 may include a mechanism to generate a new and/or modify an existing batch configuration document 212 from the configuration files 206 on device 200. Batch tuner 210 may also include a mechanism to generate new and/or modify existing configuration files 206 from an existing batch configuration document 212. In one embodiment, the batch configuration document 212 is a markup language document. In one embodiment, the existing configuration files 206 are also markup language documents. In one embodiment, the markup language used is the eXtensible Markup Language (XML). Other embodiments may use other document formats.

eXtensible Markup Language (XML) is an example of an SGML-based markup language. There is a DTD for XML. XML is a flexible way to create common information formats and share both the format and the data on the World Wide Web, intranets, and elsewhere. XML describes the contents of a page or file in terms of what data is being described. This means that an XML file may be processed purely as data by a program, may be stored with similar data on another computer or may be displayed. XML is "extensible" because the markup symbols are unlimited and self-defining.

In one embodiment, the mechanism to generate a new or modify an existing batch configuration document 212 may use one or more executable scripts 214 written in a script language such as Perl, or alternatively in a compiled language such as Java, C or C++. Note that in some embodiments other languages besides the ones mentioned above may be used. The script 214 may be referred to as a generator script. The generator script 214 may, when executed, parse a portion or all of the available tunable configuration files 206 on device 200 and build these into a batch configuration document 212. If the batch configuration document 212 does not already exist, the generator script 214 may create a new batch configuration document 212. If the batch configuration document 212 does exist, the generator script 214 may modify the existing batch configuration document 212, or alternatively may create a new version of the batch configuration document 212. The generator script 214 may be modified to add and/or remove configuration files 206 that will be parsed, to change the name and/or destination of the generated batch configuration document 212, or to make other modifications as necessary.

In one embodiment, the batch tuner 210 may include a user interface, and the mechanism to generate a new or modify an existing batch configuration document 212 may be performed manually through the user interface to the batch tuner 210. For example, the batch tuner 210 may have a user interface that allows a user to manually select configuration files 206 to be used in generating a new or modifying an existing configuration document 212. The user interface may be a text interface such as a command line interface, or alternatively may be a graphical user interface (GUI) to the batch tuner 210. Through the user interface, a user may initiate searches for tunable configuration files 206 and existing configuration documents 212, select from displayed configuration files 206 and configuration documents 212, or alternatively may manually enter the names of one or more configuration files 206 and/or configuration documents 212. Through the user interface, the user may also initiate the creation of and/or select existing configuration documents 212 to be used in the configuration process. The user interface may include a mechanism for the user to initiate the generation of a new configuration document 212, or alternatively to modify an existing configuration document 212, from the configuration files 206 specified using the user interface. The user interface to the batch tuner 210 may allow the user to perform other functions of the batch tuner 210 as well.

The batch configuration document 212 may include markup symbols (e.g. tags) that describe the contents of the configuration files 206 from which the batch configuration document 212 was generated, including all applicable tunable parameters from the configuration files 206. In one embodiment, the batch configuration document 212 may be divided into sections, with one section for each configuration file 206. Each section may describe the particular configuration file 206 to which it is associated, including all applicable tunable parameters from the configuration file 206. The sections may also include name and location (e.g. directory) information for the configuration files 206. FIG. 5 illustrates one embodiment of what such a batch configuration document 212 may look like for two configuration files. This example is not intended to be limiting in any way:

Referring again to FIG. 4, in one embodiment, the mechanism to generate new or modify existing configuration files 206 from an existing batch configuration document 212 may include an executable tuner script 216 written in a script language such as Perl, or alternatively in a compiled language such as Java, C or C++. Note that in some embodiments other languages besides the ones mentioned above may be used. The script 216 may be referred to as a tuner script. The tuner script 216 may, when executed, read a previously created batch configuration document 212, verify that the relevant component(s) 202 are present in the device 200, edit and/or create the indicated configuration files 206, and optionally reboot the intelligent device 200 if necessary. If a configuration file 206 does not exist for a component 202, the tuner script 216 may create a new configuration file 206 for the component. If a configuration file 206 for a component 202 does exist, the tuner script 216 may modify the existing file 206, or alternatively may create a new version of the file 206. In one embodiment, the tuner script 216 may be modified to add configuration files 206 to or remove configuration files 206 from the script, to change the name and/or destination of the configuration files 206 and/or the batch configuration document 212 that is to be read, or to make other modifications as necessary. If, when executing the tuner script 216, it is determined that a particular component 202 that is included in the script 216 does not exist in device 200, then the section that tunes configuration files 206 for the missing component 202 may be skipped. Alternatively, the configuration files 206 for all components 202 as specified in the script 216 may be modified and/or created regardless of whether the component(s) are present or not.

In one embodiment, the batch tuner 210 may include a user interface, and the mechanism to generate new or modify existing configuration files 206 from an existing batch configuration document 212 may be performed manually through the user interface to the batch tuner 210. For example, the batch tuner 210 may have a user interface that allows a user to select an existing configuration document 212 to be used in tuning an intelligent device 200, and to manually select configuration files 206 to be created and/or modified from the existing configuration document 212 during the tuning process. The user interface may be a text interface such as a command line interface, or alternatively may be a graphical user interface (GUI) to the batch tuner 210. Through the user interface, a user may initiate searches for tunable configuration files 206 and existing configuration documents 212, select from displayed configuration files 206 and configuration documents 212, or alternatively may manually enter the names of one or more configuration files 206 and/or configuration documents 212. Through the user interface, the user may select existing configuration documents 212 to be used in the tuning process. The user interface to the batch tuner 210 may allow the user to perform other functions of the batch tuner 210 as well.

As an example of using the method described herein to generate and use configuration documents 212 in tuning intelligent devices 200, a batch configuration document 212 may serve as a "backup" of a particular configuration of an intelligent device 200. If the configuration of the device is corrupted, changed, or otherwise modified, the batch configuration document 212 may be used to restore the device 200 to the desired configuration.

In one embodiment, multiple versions of batch configuration document 212 may be generated on an intelligent device. A user may "tune" the device 200 for a particular configuration, generate a first version of batch configuration document 212, retune the device 200 for a second configuration, generate a second version of batch configuration document 212, and so on to create a plurality of batch configuration documents 212. The user may then use batch tuner 210 to easily switch from one configuration to another configuration, for example, by running script 216 with a different batch configuration document 212 specified.

In one embodiment, there may also be multiple versions of script 214 and/or script 216. These multiple versions may specify different combinations of components 202 for different batch configuration documents 212. These different versions of batch configuration document 212 may be used to tune subsets of or all of components 202 on device 200. Thus, the user 250 may use different versions of batch configuration documents 212 to tune particular subsets of components 202 without having to retune all components 202. This may be useful, for example, if retuning one or more of components 202 would require rebooting device 200, and the user 250 desires to retune one or more other components 202 for a particular configuration without rebooting.

Note that component 202C of FIG. 4 does not have a configuration tool 204. This is to illustrate that, in one embodiment of an intelligent device 200 that includes a batch tuner 210, one or more components 202 may not require associated configuration tools 204, because batch tuner 210 may be used in lieu of the configuration tools 204 to create new and/or modify existing configuration files 206 for the components 202.

A configuration file 206 may include configuration information for multiple components 202. The configuration information in a configuration file may include one or more tunable parameters for the associated component. For example, the intelligent device 200 may include a fourth component 200D (not shown), which shares configuration file 206C with component 202C. For example, a vendor may produce a plurality of related software components, where two or more of the software components may be installed in an intelligent device. The vendor may distribute one configuration file 206 to be shared by the installed two or more software components.

Figure 6:
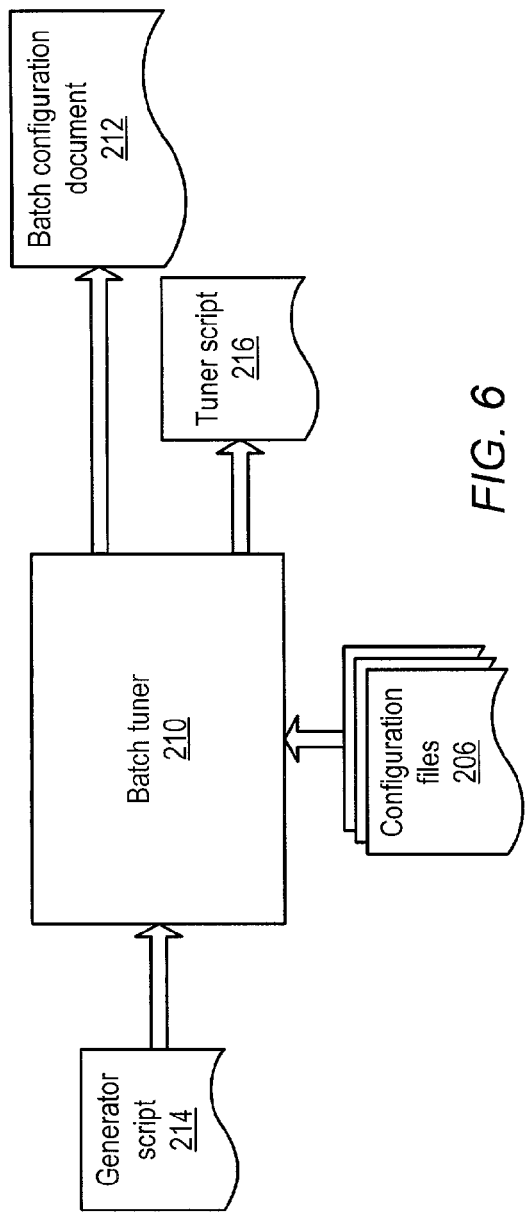
FIG. 6 illustrates a method of generating a batch configuration document from tunable configuration files according to one embodiment.

FIG. 6 is a block diagram illustrating one embodiment of a method of generating a batch configuration document 212 from tunable configuration files 206. Batch tuner 210 may accept as input a generator script 214. Batch configuration document 212, which contains all applicable tunable parameters, may be created by executing generator script 214, which parses a portion of or all of the available tunable configuration files 206 on a fully tuned intelligent device and builds these into batch configuration document 212. In one embodiment, batch configuration document 212 is in a markup language. In one embodiment, configuration files 206 are in a markup language. In one embodiment, the markup language is eXtensible Markup Language (XML). In one embodiment, a tuner script 216 may also be generated.

Figure 7:
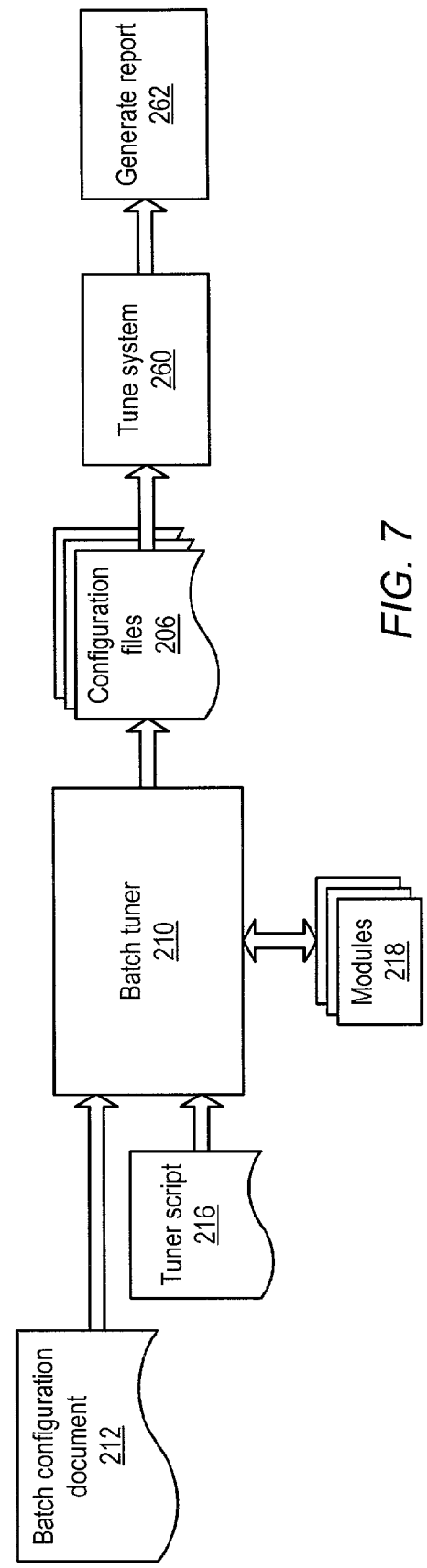
FIG. 7 illustrates a method of tuning an intelligent device using a batch configuration document according to one embodiment.

FIG. 7 is a block diagram illustrating one embodiment of a method of tuning an intelligent device using a batch configuration document 212. To tune an intelligent device, a tuner script 216 may be executed which reads the previously created batch configuration document 212 and, after verifying that the relevant software components 202 are installed, edits the tunable configuration files 206 associated with the components 202 and specified in the configuration document 212 to tune the intelligent device as shown at 260 (i.e. to set all applicable tunable parameters in all available tunable configuration files 206 to the parameter values specified in batch configuration document 212). Optionally, a report of the results of the tuning may be generated as illustrated at 262. If necessary, the intelligent device may be rebooted after the configuration files 206 have been modified. Alternatively, one or more components 202 may be reinitialized using their corresponding configuration files 206 if necessary, rather than rebooting the entire intelligent device.

In one embodiment, there may be an executable module 218 for one or more of the tunable components 202. In this embodiment, when batch tuner 210 needs to tune a particular component 202, it may call the executable module 218 for the component 202, which may then modify configuration file(s) for the component using input from batch tuner 210. In one embodiment, the executable module 218 for a component 202 may be the configuration tool 204 associated with the component 202.

In one embodiment, batch tuner 210 may be able to generically access two or more different configuration files 206 for different components 202. In one embodiment, the configuration files 206 may conform to an XML document type definition (DTD) to provide for the generic access. A document type definition (DTD) is a specific definition that follows the rules of a markup language such as the Standard Generalized Markup Language (SGML) or a markup language based on SGML. A DTD is a specification that accompanies a document and identifies what the markup elements are that separate paragraphs, identify topic headings, and so forth and how each is to be processed. By mailing a DTD with a document, any location that has a DTD reader will be able to process the document and display, print or otherwise process it as intended.

The XML DTD provides a standard document type that allows the batch tuner 210 to generically access any configuration file 206 that conforms to the DTD. The XML DTD provides a method for describing all the available tunable parameters and related files. The XML DTD may be used as a standard method of information exchange in the methods as described in FIGS. 6 and 7 and elsewhere herein. In one embodiment, batch tuner 210 may include an interpretation layer for the XML documents which conform to the DTD. In one embodiment, the XML DTD may be used for both the configuration files 206 and the batch configuration document 212. In one embodiment, batch configuration document 212 and configuration files 206 may conform to a document object model (DOM), and batch tuner 210 may use a DOM application programming interface (API) to access and/or modify the document 212 and files 206. In other embodiments, the batch tuner may use other interfaces to access the batch configuration document and configuration files, for example, SAX (Simple API for XML). SAX provides an API that allows a programmer to generate, modify and/or interpret Web files using the Extensible Markup Language (XML). In one embodiment, the modules 218 may be written to conform to a standard application programming interface (API) that allows the modules to accept a document object model (DOM) tree as an input.

The Document Object Model (DOM) is a platform- and language-neutral interface that allows programs and scripts to dynamically access and update the content, structure and style of documents (e.g. markup language documents such as XML documents). The document may be further processed and the results of that processing can be incorporated back into the presented page. A document or Web page may include objects (elements, links, etc.) that can be manipulated using DOM. Using DOM, a program or script may delete, add, or change an object, change the content of an object and/or add, delete or change an attribute of an object. The DOM application programming interface (API) provides a standardized, versatile view of a documents contents.

Building a DOM tree is typically the first step in processing a markup language (e.g. XML or HTML) document. A DOM tree is a tree of nodes, with each node corresponding to an object (element, link, attribute, text, etc.) of the markup language document the tree was generated from. A DOM tree may include a root node (also referred to as a root element or root object), one or more other levels of nodes, and terminal nodes (nodes at the lowest level on this "branch"). The terminal nodes may be thought of as the actual "data" in the tree.

When a markup language parser loads a document, it essentially scans the document, looks for elements, attributes, text, and so on and constructs a hierarchical DOM tree, using the API (e.g. DOM or SAX API), based on those items. When the parser encounters an object in the source document, it creates a new node in the tree containing a representation of that object. DOM and SAX, among others, provide an API for accessing the nodes in the document tree, and for reading, writing, and modifying individual nodes or entire fragments of the tree. The DOM tree allows the manipulation of the contents of the original markup language document.

Figure 8:
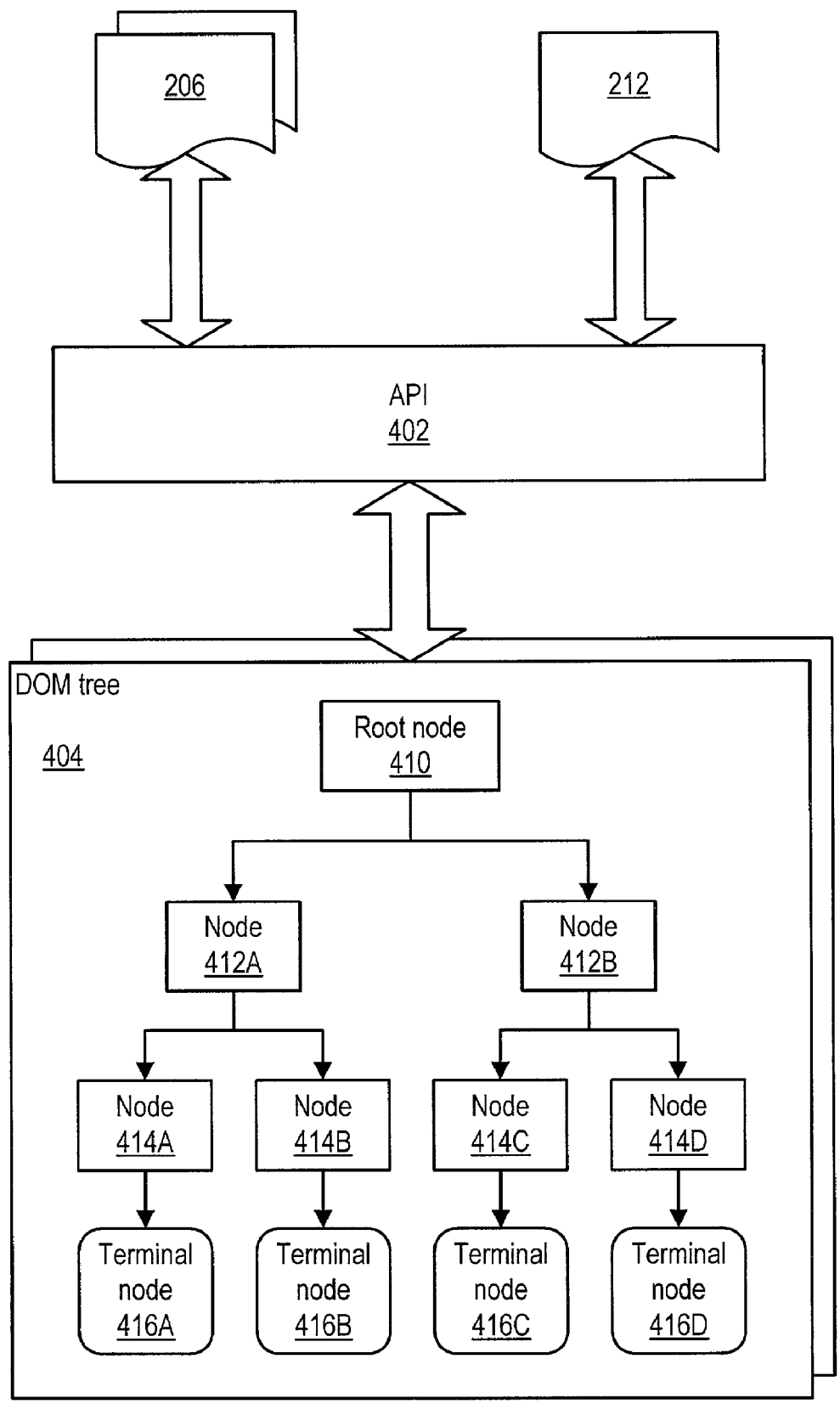
FIG. 8 illustrates a method of using an API as an interface between markup language documents according to one embodiment.

FIG. 8 illustrates a method of using an API as an interface between documents according to one embodiment. APIs that may be used include, but are not limited to, the DOM API and the SAX API. In this example, documents 206 are one or more configuration files 206 on a tunable intelligent device 200. Document 212 is a batch configuration document 212 on the intelligent device 200. Batch tuner 210 may use the DOM API 402 as an interface to the documents.

During generating batch configuration document 212 from the one or more tunable configuration files 206, batch tuner 210 may use the API 402 to construct one or more DOM trees 404 from the configuration files 206, where each configuration file 206 is associated with a particular DOM tree 404. The exemplary DOM tree 404 of FIG. 8 includes a root node 410 (which also may be referred to as a root element or root object), two levels of nodes 412 and 414, and terminal nodes 416. Terminal nodes 416 may be thought of as the actual "data" in the tree. For example, terminal nodes 416 may include the parameter values for the tunable parameters in the configuration file 206 associated with this DOM tree 404. A DOM tree 404 for a configuration file 206 may also include one or more other pieces of information about the file 206, including, but not limited to: a file name, location information for the file (e.g. a path or directory), a file description (e.g. what component(s) does this file correspond to?), links to one or more other configuration files 206 that may need to be tuned in conjunction with tuning this file, and reboot/reinitialize information (does retuning this file require reboot of the intelligent device or just reinitialization of the component?). Note that the structure of the exemplary DOM tree 404 as illustrated in FIG. 8 is not intended to be limiting in any way.

After generating a DOM tree 404 from a tunable configuration file 206, relevant information from the file 206, including the values of tunable parameters for the component 202 associated with the file 206, may be written to batch configuration document 212. If batch configuration document 212 does not exist, it may first be created. In one embodiment, batch configuration document 212 conforms to an XML DTD, and the relevant information is written to the document 212 in accordance with the XML DTD. Once all available and applicable (e.g. specified in script 214) configuration files 206 have been processed, the generation (e.g. construction or modification) of configuration document 212 may be complete.

During tuning an intelligent device 200 using a batch configuration document 212, the batch configuration document 212 may be parsed by batch tuner 210. In one embodiment, batch tuner 210 may use the API 402 to generate a DOM tree 404 for each configuration file 206 described in configuration document 212. Alternatively, batch tuner 210 may generate a DOM tree 404 that describes the entire batch configuration document 212. In this embodiment, the DOM tree 404 may be viewed as a "grove", with one DOM tree in the grove for each configuration file 206. Batch tuner 210 may then access each configuration file 206 and apply the parameter values from the DOM tree 404 to the file 206.

In one embodiment, instead of directly accessing a configuration file 206 for each component 202, batch tuner 210 may instead call an executable module 218 for each component 202. In one embodiment, batch tuner 210 may pass configuration information from the batch configuration document 212 to the module 218 to allow the module 218 to modify the corresponding configuration file 206. The module 218 may then modify the corresponding configuration file 206 using the input information. In one embodiment, the input information may include the DOM tree 404 for the corresponding configuration file 206 extracted from configuration document 212. In one embodiment, after modifying the configuration file 206 (or alternatively creating the file 206, if it did not previously exist), the module 218 may return execution control to batch tuner 210. Batch tuner 210 may then call the next module 218, if any, and so on until all required modules 218 have been called. In another embodiment, execution of the modules 218 may be asynchronous. In other words batch tuner 210 may call each module 218 and pass the corresponding configuration information (e.g. DOM tree 404) to each of the modules 218 without requiring the modules 218 to return execution control to the batch tuner 210.

Although embodiments are generally described as constructing a DOM tree from the configuration files, it is noted that other data structures, including other implementations of trees, may be used in various embodiments.

Figure 9:
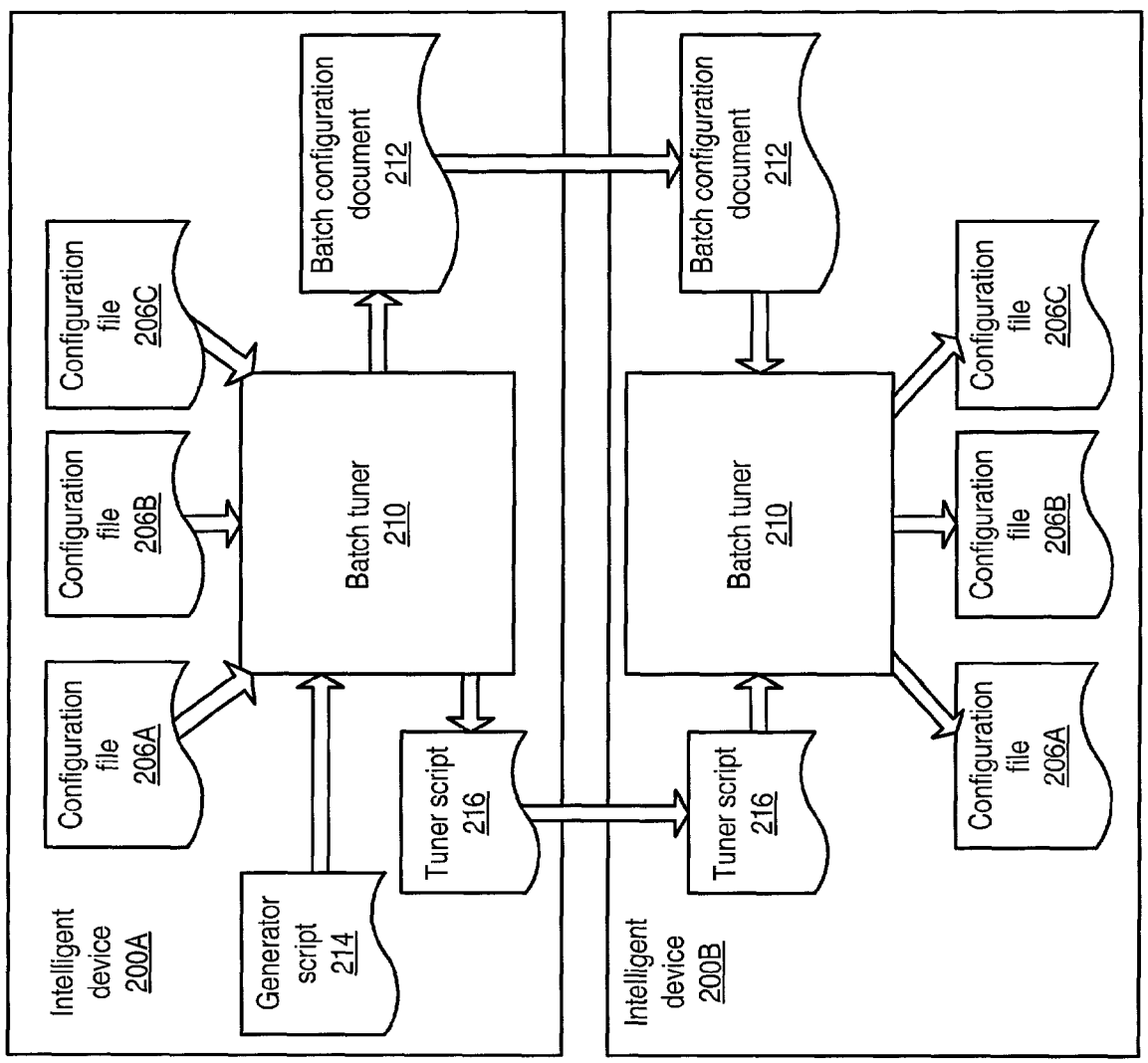
FIG. 9 illustrates generating a batch configuration document on one intelligent device, transferring the document to a second device, and using the document to batch-configure components on the second device according to one embodiment.

FIG. 9 illustrates generating a batch configuration document 212 on one intelligent device 200A, transferring the batch configuration document 212 to a second intelligent device 200B, and using the batch configuration document 212 to configure components on the second device 200B according to one embodiment. In this embodiment, batch tuner 210 may be used to generate batch configuration document 212 on device 200A in response to executing generator script 214. Configuration document 212 may be generated from one or more configuration files 206, each associated with one of one or more components 202 (not shown) on device 200A. In one embodiment, tuner script 216 may also be generated in response to executing generator script 214, or alternatively may be separately generated. Tuner script 216 and batch configuration document 212 may then be copied or transferred to device 200B. On device 200B, a copy of batch tuner 210 may be used to apply the contents of batch configuration document 212 to one or more configuration files 206 on device 200B in response to executing tuner script 216 on device 200B. In one embodiment, if one or more of the configuration files 206 does not exist on device 200B, the missing configuration file(s) may be created during the execution of tuner script 216. The configuration files 206 on device 200B are each associated with one of one or more components 202 (not shown) on device 200B.

In one embodiment, batch tuner 210 on intelligent device 200B may check to see if a component 202 specified by the information in batch configuration document 212 is present on device 200B and, if the component 202 is not present, may skip the tuning (e.g. modification and/or creation of a corresponding configuration file 206) of the missing component 202.

A component 202A (not shown) on intelligent device 200A may have a corresponding, similar component 202A (not shown) on device 200B. Configuration information for component 202A on device 200A may be located in configuration file 206A on intelligent device 200A, and may be included in batch configuration document 212 when document 212 is generated. After copying document 212 to device 200B, the configuration file 206A on device 200B may be updated with the configuration information from document 212 from configuration file 206A of device 200A. Note that component 202A of device 200B is said to be similar to component 202A of device 200B. As used herein, the term "similar components" includes the notion of two or more components 202 which are tunable (e.g. configurable) using similar configuration files 206. As used herein, the term "similar configuration files" includes the notion of two or more configuration files 206 which include one or more of the same tunable parameters and which may be used to tune similar components 202.

Note that the particular format of similar configuration files may be different. For example, the order of the tunable parameters in the two files may be different, and/or the values of the tunable parameters may be different. Two similar components 202 may be identical, or may be different in one or more aspects, but still may be configurable using a similar configuration file 206. For example, a vendor may produce a circuit board and distribute the circuit board with a configuration file 206 comprising tunable parameters. The vendor may distribute, over the lifetime of the circuit board, two or more versions of the board, where each version of the board differs in one or more aspects from each of the other versions. The configuration file 206 for the circuit board may, however, remain unchanged over the life of the board, or alternatively may have changes that do not affect the processing of the configuration file 206 by the batch tuning process described herein. For example, if a markup language is used for the configuration file 206, then the order that tunable parameters and at least some other information appears in the configuration file 206 may be changed without affecting the processing of the configuration file 206 by the batch tuning process.

In one embodiment where executable modules 218 are called by the batch tuner 210 for each component 202, for the batch tuner 210 to tune a component 202 on device 200B, an executable module 218 must be present for the batch tuner 210 to call. In this embodiment, if a module 218 is not present for a component 202, the component may not be tuned. In one embodiment, one or more executable modules 218 may be copied from device 200A to device 200B in addition to document 212 and other documents. Alternatively an executable module 218 may be installed from another source, e.g. an executable module 218 for a particular component 202 may be downloaded from the vendor's Web site.

Note that intelligent devices 200A and 200B may be similar devices (e.g. the platform, operating system, suite of components 202, etc. may be similar). In one embodiment, devices 200A and 200B may be different (e.g. one or more of the platform, operating system, suite of components 202, etc. may be different). In one embodiment, one or more of the objects used in batch tuning as described herein (e.g. configuration document 212, configuration files 206, modules 218, etc.) are implemented to be platform-independent. In one embodiment, the objects conform to a platform-independent markup language (e.g. XML) DTD and DOM API. In other embodiments, the objects may conform to other markup languages and/or APIs, for example, the SAX API.

The following is an example of generating a batch configuration document 212 on one intelligent device 200 and transferring it other intelligent devices 200. A workstation manufacturer may have a default configuration for each different model of workstation produced. After the assembly of a particular workstation, a copy of a "default" configuration document 212 and corresponding tuner script 216, previously created on a different workstation, may be copied (e.g. by floppy disk, CD, or over the network) to the workstation and executed by batch tuner 210 to tune the workstation to its "default" configuration.

Figure 10:
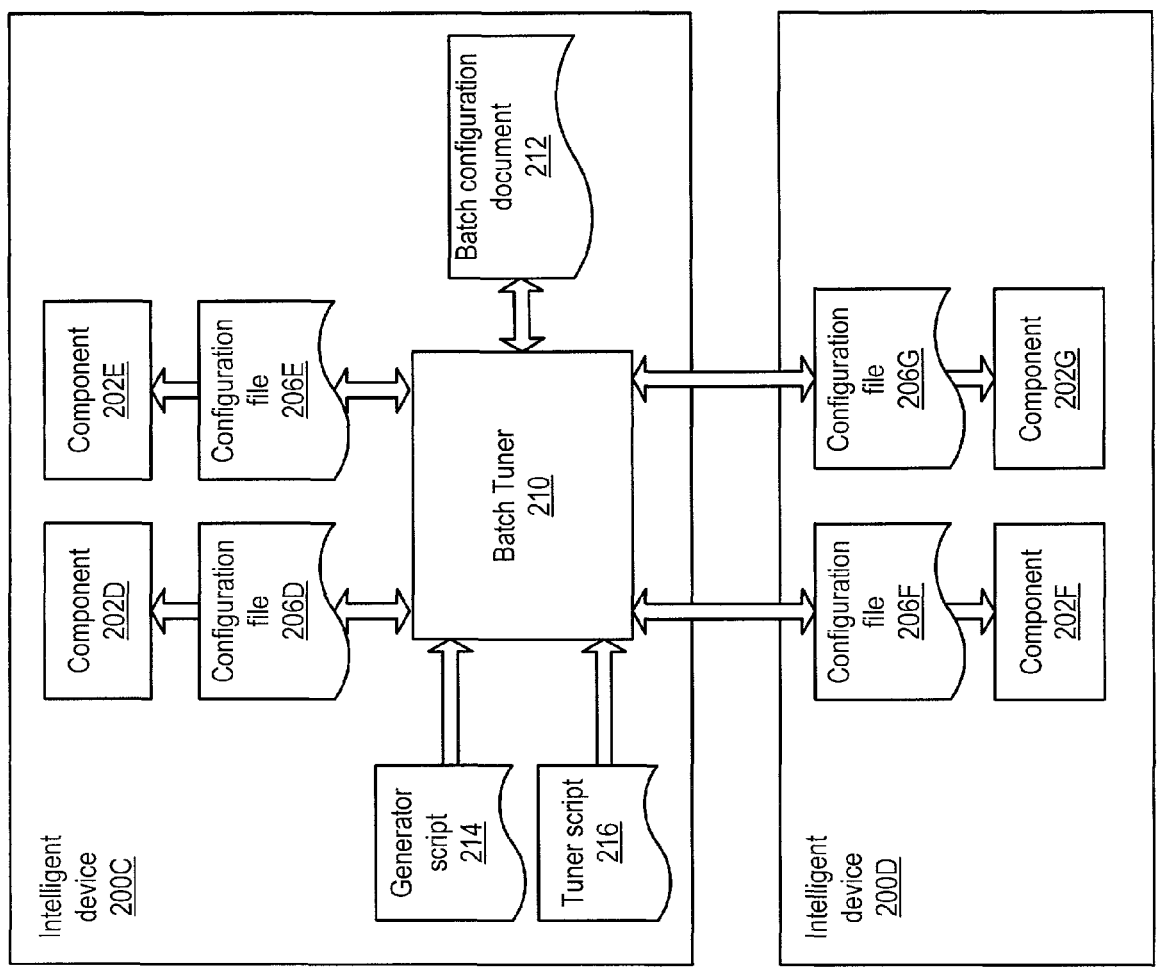
FIG. 10 illustrates an intelligent device with a mechanism for batch-tuning components within multiple devices according to one embodiment.

FIG. 10 illustrates an intelligent device 200C with a mechanism for batch-tuning components within two or more intelligent devices 200 according to one embodiment. In this embodiment, batch tuner 210 may be used to generate batch configuration document 212 in response to executing generator script 214. In this embodiment, configuration document 212 may be generated from one or more configuration files 206 each associated with a component 202 on a first intelligent device 200C, and from one or more configuration files 206 each associated with a component 202 on a second intelligent device 200D. Batch tuner 210 may then be used to tune both devices 200C and 200D by applying the contents of batch configuration document 212 to one or more configuration files 206 on device 200C and 200D in response to executing tuner script 216 on device 200C.

In one embodiment, a configuration document 212 may be generated by batch tuner 210 on device 200C from only the one or more configuration files 206 on a second intelligent device 200D, or from two or more other intelligent devices 200. Batch tuner 210 may then be used to tune device 200D by applying the contents of batch configuration document 212 to one or more configuration files 206 on device 200D in response to executing a tuner script 216 on device 200C.

For example, a system may include a workstation and one or more other intelligent devices such as printers, scanners, etc. A configuration document 212 may be generated on the workstation that includes tuning information for the workstation and for one or more of the other intelligent devices in the system. To tune the system, a tuner script 216 corresponding to the configuration document 212 may be executed on the workstation, and the tuning information in the configuration document 212 may be applied to the workstation and to one or more of the other intelligent devices in the system.

The intelligent devices 200 as illustrated in FIGS. 9 and 10 may be connected and may communicate via a network such as the Internet, or via a direct connection (wired or wireless) such as a bus, a serial connection or a parallel connection between the intelligent devices 200. For example, intelligent devices 200 may be connected via a Universal Serial Bus (USB), General Purpose Interface Bus (GPIB), FireWire, IRDA, or other type of connection. One skilled in the art will recognize that there are numerous other wired and wireless mechanisms that may be used to connect two or more intelligent devices 200.

Figure 11:
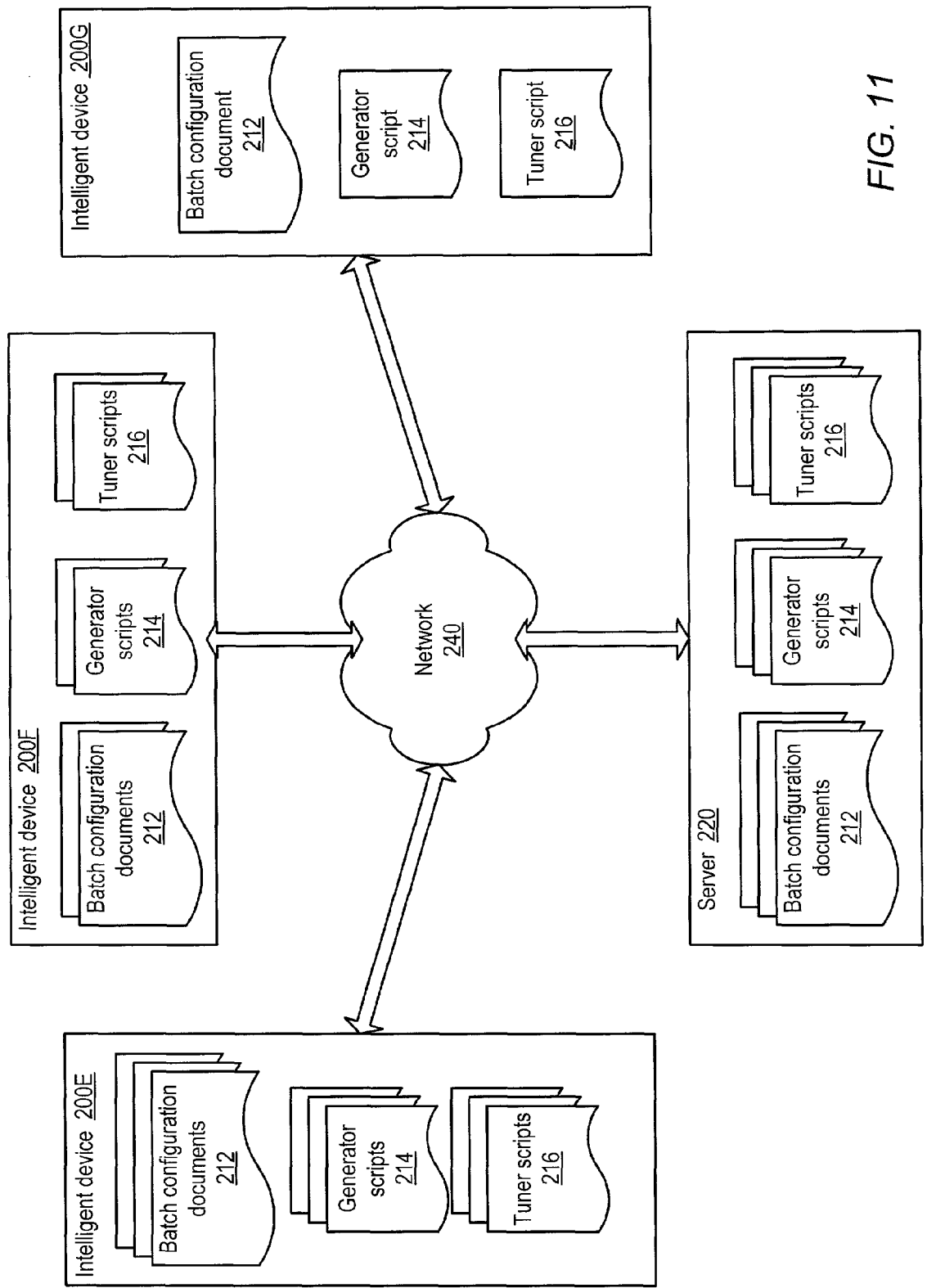
FIG. 11 illustrates multiple intelligent devices that may access one or more batch configuration documents from a server on a network according to one embodiment.

FIG. 11 illustrates multiple intelligent devices 200 that may access one or more batch configuration documents 212 from a server on a network 240 according to one embodiment. In this embodiment, one or more intelligent devices 200 are coupled to network 240. A server 220 is also coupled to the network 240. One or more batch configuration documents 212 may be generated on one or more of the intelligent devices 200 and copied to server 220. In one embodiment, one or more batch configuration documents 212 may also be generated on server 220. In one embodiment, one or more tuner scripts 216, each associated with one of the configuration documents 212, may also be copied to server 220. Intelligent devices 200 may then download one or more of the batch configuration documents 212 and tuner scripts 216 as required. On an intelligent device 200, a downloaded tuner script 216 may then be executed by a batch tuner 210 on the intelligent device 200 to tune the one or more components 202 on the intelligent device 200 with corresponding tuning information in the configuration document 212 accessed by this tuner script 216.

For example, a company may be divided into different business units that require different configurations for desktop computers. The business may have a server 220 that stores different versions of configuration documents 212 for the desktop computers in the different units. When a unit adds a new desktop computer, the configuration document 212 and corresponding tuner script 216 for the business unit may be downloaded from the server 220 to the new computer. The tuner script 216 may then be executed on the new computer to tune the computer to meet the requirements of the business unit.

Figure 12:
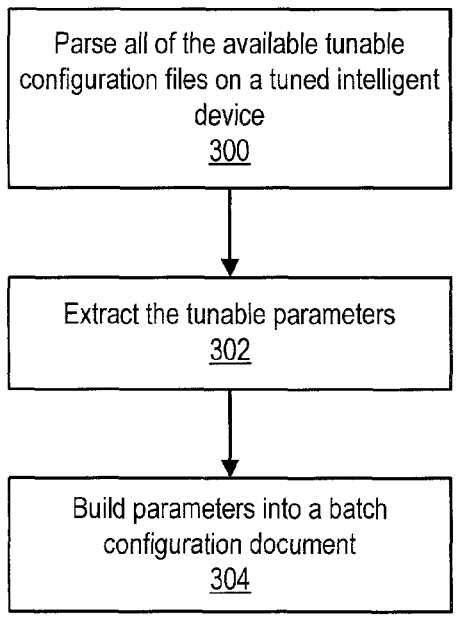
FIG. 12 is a flowchart illustrating a method for generating a batch configuration document from multiple tunable configuration files according to one embodiment.

FIG. 12 is a flowchart illustrating a method for generating a batch configuration document 212 from multiple tunable configuration files 206 according to one embodiment. As indicated at 300, available tunable configuration files 206 on a tuned intelligent device 200 are parsed to locate tunable parameters to be added to a batch configuration document 212. In one embodiment, a generator script 214 may be executed that directs the parsing of all available tunable files 206. Alternatively, the tuner script 214 may direct the parsing of a portion of the available tunable files 206. In one embodiment, a user of the intelligent device 200 may execute the generator script 214 from an interface of a batch tuner 210.

Tunable parameters may be extracted from the parsed tunable files 206 as indicated at 302. In one embodiment, the process of parsing the tunable files 206 and extracting tunable parameters may include construction one or more DOM trees 404 from the tunable files 206. A batch configuration document 212 may be created (or modified if one already exists), and the extracted tunable parameters may be added to and/or modified in the document 212 as indicated at 304. In one embodiment, the extracted parameters may be stored in the document 212 in a markup language format. In one embodiment, the markup language is XML. In one embodiment, the tunable parameter information for each parsed file 206 may be stored in a portion of the configuration document 212 for the particular file 206, similar to the example file of FIG. 5.

Figure 13:
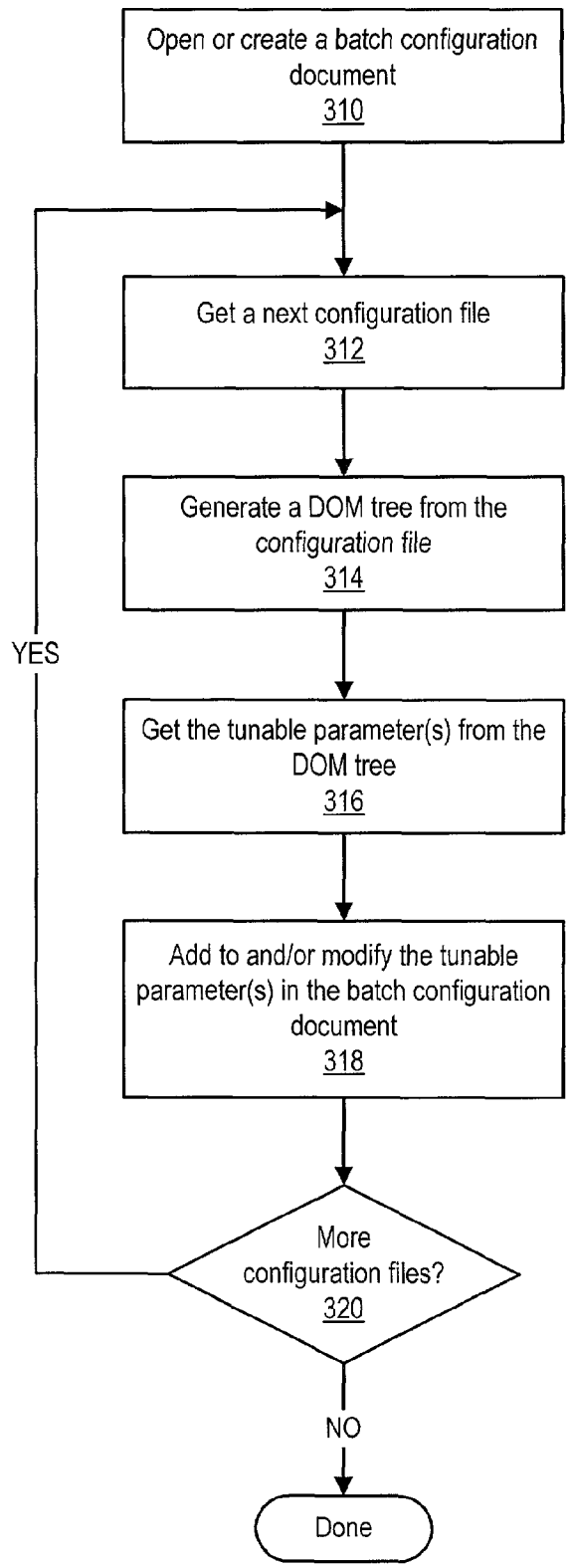
FIG. 13 is a flowchart further illustrating a method for generating a batch configuration document from multiple tunable configuration files according to one embodiment.

FIG. 13 is a flowchart that further illustrates a method for generating a batch configuration document 212 from multiple tunable configuration files 206 according to one embodiment. In one embodiment, the method may be performed by executing a generator script 214 on the intelligent device 200 for which a configuration document 212 is to be created or modified. At 310, an existing batch configuration document 212 may be opened, or alternatively a new batch configuration document 212 may be created. At 312, a next tunable configuration file 206 may be located and opened. In one embodiment, a DOM tree 404 may be generated from the configuration file 206 as indicated at 314. In one embodiment, the configuration file 206 may be in a markup language. In one embodiment, the markup language is XML. Since the contents of a markup language document are generally organized in a tree structure, the method may convert the tree structure of the document 206 into a DOM tree 404 for processing. The method then may locate and extract the tunable parameters from the DOM tree 404 as indicated at 316. As indicated at 318, the tunable parameters for the current file 206 being parsed may then be added to the batch configuration document 212, or alternatively the tunable parameters may be modified in the configuration document 212 if the tunable parameters have been previously added to the configuration document 212. If there are more tunable files 206 to be parsed as indicated at 320, then 312 through 318 may be repeated until all tunable files 206 are parsed, or alternatively until all tunable files 206 specified in the generator script 214 are parsed.

Figure 14:
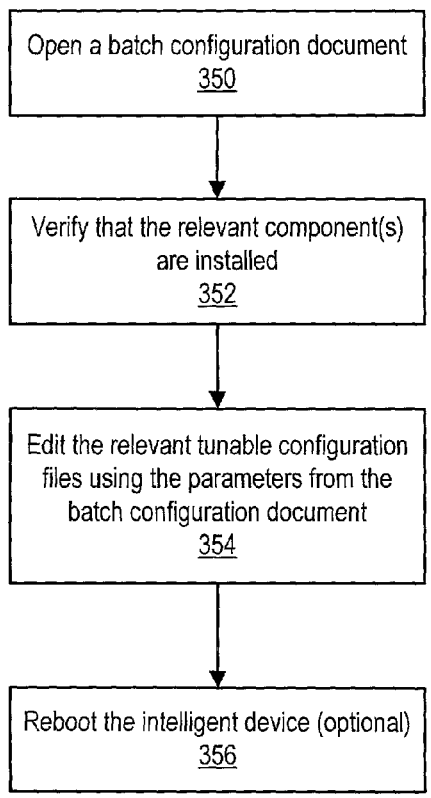
FIG. 14 is a flowchart illustrating a method for using a batch configuration document to tune multiple components of an intelligent device according to one embodiment.

FIG. 14 is a flowchart illustrating a method for using a batch configuration document 212 to batch tune multiple components 202 of an intelligent device 200 according to one embodiment. At 350, a batch configuration document 212 may be opened for processing. The method may verify that the components 202 to be tuned by the execution of document 212 are present in the intelligent device 212 as indicated at 352. The tunable parameters in all relevant tunable configuration files 206 for the components 202 present in the intelligent device 200 may then be edited using the parameter values from the document 212 as indicated at 354. After all of the configuration files 206 have been configured with the parameter values as specified in the document 212, the intelligent device 200 may optionally be rebooted as indicated at 356 to apply the modified parameter values to the components 202 (i.e. to "tune" the intelligent device). Alternatively, one or more of the components 202 may be reinitialized with the new parameter values without rebooting the intelligent device 200.

Figure 15:
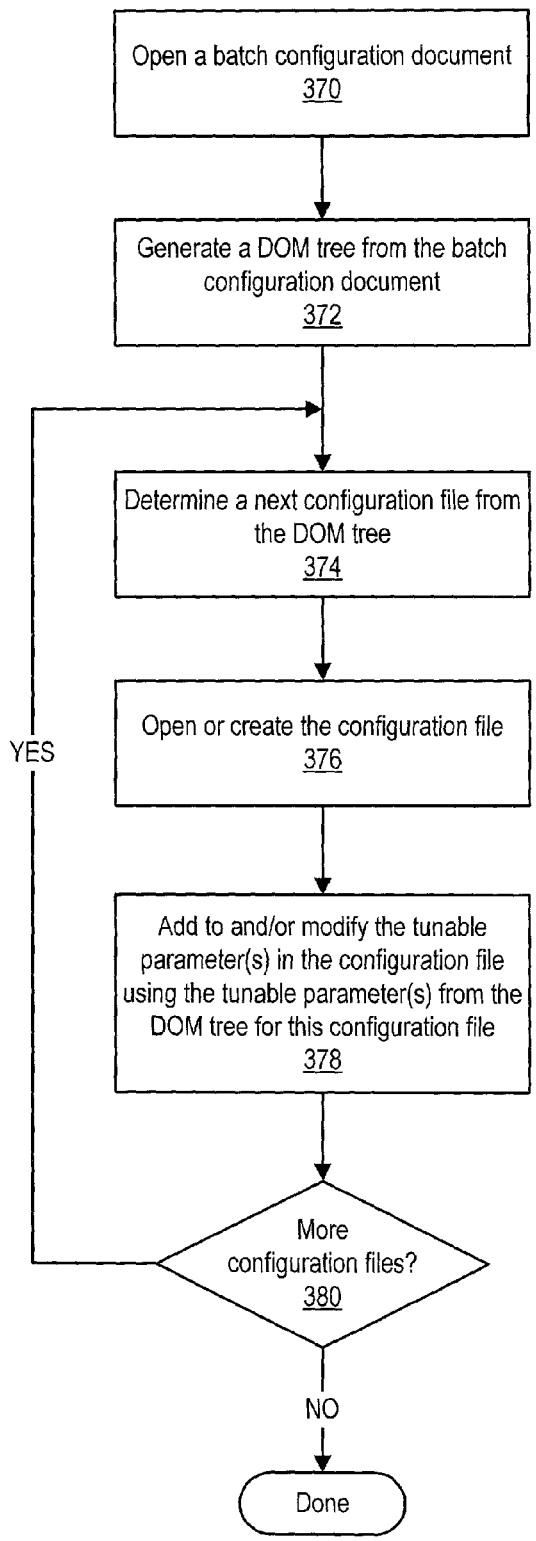
FIG. 15 is a flowchart further illustrating a method for using a batch configuration document to tune multiple components of an intelligent device according to one embodiment.

FIG. 15 is a flowchart that further illustrates a method for using a batch configuration document 212 to tune multiple components 202 of an intelligent device 200 according to one embodiment. In one embodiment, the method may be performed by executing a tuner script 216 on the intelligent device 200 to be tuned. In one embodiment, the tuner script 216 may direct the processing of batch configuration document 212 to tune the intelligent device 200. In one embodiment, a user of the intelligent device 200 may execute the tuner script 216 from an interface of a batch tuner 210. In one embodiment, the tuner script 216 and the batch configuration document 212 may be merged into one document.

At 370, a batch configuration document 212 may be opened for processing. In one embodiment, a DOM tree 404 may be generated from the batch configuration document 212 as indicated at 372. In one embodiment, the configuration document 212 may be in a markup language. In one embodiment, the markup language is XML. Since the contents of a markup language document are generally organized in a tree structure, the method may convert the tree structure of the document 212 into a DOM tree 404 for processing. In one embodiment, the method may convert the tree structure of the document 212 into a "grove" of DOM trees 404, with one DOM tree in the grove for each configuration file 206 to be edited during the processing of the batch configuration document 212.

Using the DOM tree 404 generated at 372, a next configuration file 206 to be processed may be selected as indicated at 374. The selected configuration file 206 may then be opened as indicated at 376. If the configuration file 206 does not exist, then it may first be created. The portion of the DOM tree 404 generated at 372 for the configuration file 206 may then be used to add and/or modify the values of the tunable parameters in the opened configuration file 206 as indicated at 378. In one embodiment, the portion of the DOM tree 404 for the particular component 202 may be passed to a module 218 for the component 202 associated with the configuration file 206, and the module 218 may perform the actions indicated at 376 and 378.

If the DOM tree 404 generated from the configuration document 212 includes more configuration files 206 to be tuned, then processing may return to 374 as indicated at 380. If all the configuration files 206 indicated in the configuration document 212 have been modified (or optionally skipped if the corresponding component 202 is not present in the device 200), then the tuning of the configuration files 206 on the intelligent device 200 using the configuration document 212 has been completed. The intelligent device 200 may then optionally be rebooted to implement the tuning of the specified components 202.

The methods as described in FIGS. 12 through 15 may be implemented in software, hardware, or a combination thereof. The order of method may be changed, and various steps may be added, reordered, combined, omitted, modified, etc.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for batch-tuning multiple components of intelligent devices have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
   using a computer to perform:
   accessing a plurality of configuration files on an intelligent device, wherein the intelligent device is an individual electronic device, wherein each of the plurality of configuration files includes configuration information for a respective one of a plurality of software components included on the intelligent device and executable by a processor on the intelligent device, and wherein each of the plurality of software components is a different executable entity; and
   generating a batch configuration document from the accessed plurality of configuration files, wherein the batch configuration document includes the configuration information for the plurality of software components included on the intelligent device;
   wherein, after said generating, the batch configuration document is accessible for use in configuring the plurality of software components included on the intelligent device whose configuration files were used in said generating the batch configuration document.

2. The method as recited in claim 1, wherein said accessing the plurality of configuration files and said generating the batch configuration document are performed by executing a script on the intelligent device, wherein the script includes one or more executable instructions for selecting the plurality of configuration files to be accessed and one or more executable instructions for performing said generating the batch configuration document.

3. The method as recited in claim 1, further comprising, prior to said accessing the plurality of configuration files on the intelligent device, using the computer to perform configuring the plurality of software components included on the intelligent device, wherein said configuring the plurality of software components included on the intelligent device sets the configuration information in the plurality of configuration files on the intelligent device.

4. The method as recited in claim 1, further comprising using the computer to perform transferring the batch configuration document generated from the plurality of configuration files on the intelligent device to another intelligent device for use in configuring one or more software components of the other intelligent device.

5. The method as recited in claim 1, wherein the batch configuration document further includes configuration information for one or more software components of one or more other intelligent devices.

6. The method as recited in claim 1, wherein said generating the batch configuration document comprises generating a Document Object Model (DOM) tree from each of the accessed configuration files, wherein the configuration information incorporated in the batch configuration document is accessed from the DOM trees generated from the plurality of configuration files.

7. The method as recited in claim 1, further comprising using the computer to perform configuring one or more of the plurality of software components of the intelligent device using the batch configuration document, wherein said configuring comprises applying configuration information from the batch configuration document for each of the one or more of the plurality of software components to a respective configuration file on the intelligent device for each of the one or more of the plurality of software components of the intelligent device.

8. The method as recited in claim 7, wherein said configuring the one or more of the plurality of software components of the intelligent device further comprises initializing each of the one or more of the plurality of software components, wherein initializing each of the one or more of the plurality of software components comprises initializing the software component using the configuration information from the respective one of the one or more configuration files on the intelligent device to which configuration information from the batch configuration document was applied.

9. The method as recited in claim 1, wherein the plurality of software components includes one or more software application programs.

10. The method as recited in claim 1, wherein the plurality of software components includes one or more system software components.

11. The method as recited in claim 1, wherein the plurality of software components includes one or more software drivers for hardware components.

12. The method as recited in claim 1, wherein at least one of the plurality of configuration files includes operating system configuration information for the intelligent device.

13. The method as recited in claim 1, wherein the batch configuration document is a markup language document.

14. The method as recited in claim 13, wherein the markup language is eXtensible Markup Language (XML).

15. The method as recited in claim 1, wherein the batch configuration document and the plurality of configuration files conform to an eXtensible Markup Language (XML) Document Type Definition (DTD).

16. A method, comprising:
using a computer to perform:
accessing a batch configuration document, wherein the batch configuration document comprises configuration information for each of a plurality of software components included on an intelligent device and executable by a processor on the intelligent device, wherein the intelligent device is an individual electronic device, and wherein each of the plurality of software components is a different executable entity; and
applying configuration information from the batch configuration document for each of one or more of the plurality of software components to a respective configuration file on the intelligent device for each of the one or more of the plurality of software components included on the intelligent device to configure each of the one or more of the plurality of software components.

17. The method as recited in claim 16, wherein said applying the configuration information from the batch configuration document for each of one or more of the plurality of software components to a respective configuration file on the intelligent device comprises replacing one or more current parameter values in the respective configuration file with new parameter values from the batch configuration document.

18. The method as recited in claim 16, wherein said accessing and said applying are performed by executing a script on the intelligent device, wherein the script includes one or more executable instructions for accessing the batch configuration document and one or more executable instructions for selecting the respective configuration files to be configured.

19. The method as recited in claim 16, wherein said accessing the batch configuration document comprises generating a Document Object Model (DOM) tree from the batch configuration document, wherein the DOM tree includes the configuration information for the respective configuration files for each of the one or more of the plurality of software components included on the intelligent device.

20. The method as recited in claim 19, wherein said applying the configuration information to the respective configuration files comprises accessing the configuration information from the DOM tree generated from the batch configuration document.

21. The method as recited in claim 16, wherein said accessing the batch configuration document comprises generating a Document Object Model (DOM) tree for each of the respective configuration files from the configuration information in the batch configuration document, wherein each of the generated DOM trees comprises the configuration information for its respective configuration file.

22. The method as recited in claim 21, wherein, said applying the configuration information comprises:
for each of the one or more of the plurality of software components included on the intelligent device:
calling a module associated with the component;
passing a DOM tree generated from the respective configuration for the component to the called module, wherein the respective configuration file is associated with the component, and wherein the DOM tree includes configuration information for the component; and
the called module applying the configuration information from the DOM tree to the respective configuration file associated with the component.

23. The method as recited in claim 16, wherein the plurality of software components includes one or more software application programs.

24. The method as recited in claim 16, wherein the plurality of software components includes one or more system software components.

25. The method as recited in claim 16, wherein the plurality of software components includes one or more software drivers for hardware components.

26. The method as recited in claim 16, wherein at least one of the one or more configuration files includes operating system configuration information for the intelligent device.

27. The method as recited in claim 16, wherein the batch configuration document is a markup language document.

28. The method as recited in claim 27, wherein the markup language is eXtensible Markup Language (XML).

29. The method as recited in claim 16, wherein the batch configuration document and the respective configuration files conform to an eXtensible Markup Language (XML) Document Type Definition (DTD).

30. The method as recited in claim 16, further comprising using the computer to perform rebooting the intelligent device after said applying the configuration information from the batch configuration document to the respective configuration files, wherein said rebooting applies the configuration information from the respective configuration files to the one or more of the plurality of software components of the intelligent device for which they include configuration information.

31. The method as recited in claim 16, further comprising using the computer to perform initializing one or more of the plurality of software components of the intelligent device after said applying the configuration information from the batch configuration document to the respective configuration files, wherein, in said initializing, each of the one or more of the plurality of software components is initialized using the configuration information from the respective configuration file comprising configuration information for the component.

32. The method as recited in claim 16, further comprising, prior to said accessing, using the computer to perform generating the batch configuration document on an intelligent device other than the intelligent device on which the batch document is to be accessed by said accessing.

33. A method comprising:
using a computer to perform:
generating a batch configuration document on a first intelligent device from a plurality of configuration files accessed on the first intelligent device, wherein the first intelligent device is an individual electronic device, wherein each of the plurality of configuration files includes configuration information for a respective one of one or more software components included on the first intelligent device and executable by a processor on the first intelligent device, wherein each of the plurality of software components is a different executable entity, and wherein the batch configuration document includes the configuration information from the plurality of configuration files; and
configuring one or more software components of a second intelligent device using the batch configuration document generated on the first intelligent device.

34. The method as recited in claim 33, wherein said configuring comprises applying configuration information from the batch configuration document generated on the first intelligent device to one or more configuration files on the second device, wherein each of the one or more configuration files on the second intelligent device comprises configuration information for a respective one of the one or more software components of the second intelligent device.

35. The method as recited in claim 33, wherein the batch configuration document is a markup language document.

36. The method as recited in claim 35, wherein the markup language is eXtensible Markup Language (XML), and wherein the batch configuration document and the plurality of configuration files conform to an XML Document Type Definition (DTD).

37. The method as recited in claim 33, wherein the one or more software components include one or more of: a software application program, a system software component, or a software driver for a hardware component.

38. The method as recited in claim 33, wherein at least one of the plurality of configuration files on the first intelligent device includes operating system configuration information for the first intelligent device, wherein the batch configuration document includes the operating system configuration information of the first intelligent device, and wherein said configuring the one or more software components of the second intelligent device comprises configuring an operating system of the second intelligent device using the operating system configuration information of the first intelligent device included in the batch configuration document.

39. The method as recited in claim 33, further comprising using the computer to perform rebooting the second intelligent device after said configuring, wherein said rebooting applies the configuration information from the batch configuration document generated on the first intelligent device to the one or more software components of the second intelligent device.

40. The method as recited in claim 33, further comprising:
using the computer to perform
storing the generated batch configuration document on a server, wherein the server is coupled to the second intelligent device via a network; and
downloading the stored batch configuration document to the second intelligent device;
wherein said configuring the one or more software components of the second intelligent device uses the downloaded batch configuration document.

41. A method comprising:
using a computer to perform:
accessing one or more configuration files on each of a plurality of intelligent devices, wherein each of the intelligent devices is an individual electronic device, wherein each of the one or more configuration files on each of the plurality of intelligent devices includes configuration information for a respective one of one or more software components included on the intelligent device and executable by a processor on the intelligent device, and wherein each of the plurality of software components is a different executable entity; and
generating a batch configuration document from the one or more accessed configuration files on each of the plurality of intelligent devices, wherein the batch configuration document includes the configuration information for the one or more software components included on each of the plurality of intelligent devices;
wherein, after said generating, the batch configuration document is accessible for use in configuring the plurality of intelligent devices whose configuration files were used in said generating the batch configuration document.

42. The method as recited in claim 41, wherein the batch configuration document is further accessible for use in configuring one or more intelligent devices other than the plurality of intelligent devices whose configuration files were used in said generating the batch configuration document.

43. The method as recited in claim 41, wherein said configuring the plurality of intelligent devices comprises applying the configuration information from the batch configuration document to the respective configuration files for each of the one or more software components included on each of the plurality of intelligent devices.

44. The method as recited in claim 41, wherein the one or more software components included on each of the plurality of intelligent devices includes at least one of: a software application program, a system software component, or a software driver for a hardware component.

45. The method as recited in claim 41, wherein at least one of the configuration files of at least one of the plurality of intelligent devices includes operating system configuration information for the intelligent device.

46. The method as recited in claim 41, wherein the batch configuration document is a markup language document.

47. The method as recited in claim 46, wherein the markup language is eXtensible Markup Language (XML), and wherein the batch configuration document and each of the one or more configuration files on each of the plurality of intelligent devices conform to an eXtensible Markup Language (XML) Document Type Definition (DTD).

48. An intelligent device, comprising:
a processor;
a plurality of software components, each of which is a different executable entity executable on the processor of the intelligent device;
a plurality of configuration files, wherein each of the plurality of configuration files is associated with a respective one of the plurality of software components, and wherein each of the plurality of configuration files includes configuration information for its associated component; and a memory operable to store program instructions, wherein the program instructions are executable by the processor to:

open each of the plurality of configuration files to access the configuration information for the respective software component associated with the configuration file; and generate a batch configuration document from the configuration information accessed from each of the plurality of configuration files;

wherein the batch configuration document includes the configuration information from each of the plurality of configuration files; and wherein, after said generating, the batch configuration document is accessible for use in configuring the plurality of software components in the intelligent device;

wherein the intelligent devices is an individual electronic device.

49. The intelligent device as recited in claim 48, wherein the batch configuration document is further transferable to another intelligent device comprising one or more software components similar to software components comprised in the plurality of software components of the intelligent device for use in configuring the other intelligent device.

50. The intelligent device as recited in claim 48, wherein, in said generating the batch configuration document, the program instructions are further executable by the processor to generate a Document Object Model (DOM) tree from each of the plurality of configuration files, wherein the configuration information included in the configuration document is accessed from the DOM trees generated from the plurality of configuration files.

51. The intelligent device as recited in claim 48, wherein, in said configuring the plurality of software components of the intelligent device, the program instructions are further executable by the processor to apply the configuration information from the batch configuration document to the respective configuration file associated with each of the plurality of software components of the intelligent device.

52. The intelligent device as recited in claim 48, wherein the plurality of software components includes one or more of: a software application program, a system software component, or a software driver for a hardware component.

53. The intelligent device as recited in claim 48, wherein the intelligent device further comprises an operating system for the intelligent device, and wherein at least one of the plurality of configuration files includes operating system configuration information for the intelligent device.

54. The intelligent device as recited in claim 48, wherein the batch configuration document is a markup language document.

55. The intelligent device as recited in claim 54, wherein the markup language is eXtensible Markup Language (XML), and wherein the batch configuration document and the plurality of configuration files conform to an eXtensible Markup Language (XML) Document Type Definition (DTD).

56. An intelligent device, comprising:

a processor;

a plurality of software components, each of which is a different executable entity executable on the processor of the intelligent device;

a plurality of configuration files, wherein each of the plurality of configuration files is associated with a respective one of the plurality of software components, and wherein each of the plurality of configuration files includes configuration information for its associated software component; and a memory operable to store program instructions, wherein the program instructions are executable by the processor to:

open a batch configuration document, wherein the batch configuration document comprises configuration information for the plurality of software components of the intelligent device; and apply configuration information from the batch configuration document to each of the plurality of configuration files on the intelligent device to configure the respective plurality of software components of the intelligent device;

wherein the intelligent devices is an individual electronic device.

57. The intelligent device as recited in claim 56, wherein the program instructions are further executable by the processor to:

generate a Document Object Model (DOM) tree from the batch configuration document, wherein the DOM tree includes the configuration information for the plurality of configuration files; and wherein, in said applying the configuration information to each of the plurality of configuration files, the program instructions are further executable by the processor to access the configuration information from the DOM tree generated from the batch configuration document.

58. The intelligent device as recited in claim 56, wherein, in said accessing the batch configuration document, the program instructions are further executable by the processor to:

generate a respective Document Object Model (DOM) tree for each of the plurality of configuration files from the configuration information in the batch configuration document, wherein each of the generated DOM trees comprises the configuration information for its associated configuration file;

wherein the intelligent device further comprises a plurality of executable modules each associated with one of the plurality of software components, wherein each of the plurality of executable modules is operable to apply configuration information from one of the DOM trees to the respective one of the plurality of configuration files associated with the software component that is associated with the executable module.

59. The intelligent device as recited in claim 58, wherein, in said applying the configuration information to the plurality of configuration files, the program instructions are further executable by the processor to:

for each of the plurality of software components of the intelligent device:

call one of the plurality of executable modules, wherein the called module is associated with the software component; and pass a DOM tree generated from one of the plurality of configuration files to the called module, wherein the configuration file is associated with the software component, and wherein the DOM tree includes configuration information for the software component; and wherein the called module is operable to apply the configuration information from the DOM tree to the configuration file associated with the software component.

60. The intelligent device as recited in claim 56, wherein the plurality of software components includes one or more of:

a software application program, a system software component, or a software driver for a hardware component.

61. The intelligent device as recited in claim 56, wherein the intelligent device further comprises an operating system for the intelligent device, and wherein at least one of the plurality of configuration files includes operating system configuration information for the intelligent device.

62. The intelligent device as recited in claim 56, wherein the batch configuration document is a markup language document.

63. The intelligent device as recited in claim 62, wherein the markup language is eXtensible Markup Language (XML), and wherein the batch configuration document and the one or more configuration files conform to an eXtensible Markup Language (XML) Document Type Definition (DTD).

64. The intelligent device as recited in claim 56, wherein to configure the respective plurality of software components of the intelligent device, the intelligent device is operable to reboot after said applying the configuration information, wherein said rebooting applies the configuration information that was applied to the plurality of configuration files to the plurality of software components of the intelligent device.

65. The intelligent device as recited in claim 56, wherein the program instructions are further executable by the processor to initialize each of the plurality of software components of the intelligent device, wherein said initializing uses the configuration information from the respective configuration files associated with each of the software components.

66. A tangible, computer-accessible storage medium storing program instructions that when executed on one or more computers cause the one or more computers to perform:
    accessing a plurality of configuration files on an intelligent device, wherein the intelligent device is an individual electronic device, wherein each of the plurality of configuration files includes configuration information for a respective one of a plurality of software components included on the intelligent device and executable by a processor on the intelligent device, and wherein each of the plurality of software components is a different executable entity; and
    generating a batch configuration document from the accessed plurality of configuration files, wherein the batch configuration document includes the configuration information for the plurality of software components included on the intelligent device;
    wherein, after said generating, the batch configuration document is accessible for use in configuring the plurality of software components included on the intelligent device whose configuration files were used in said generating the batch configuration document.

67. The tangible, computer-accessible storage medium as recited in claim 66, wherein, in said generating the batch configuration document, executing the program instructions further causes the one or more computers to perform generating a Document Object Model (DOM) tree from each of the plurality of accessed configuration files, wherein the configuration information incorporated in the configuration document is accessed from the DOM trees generated from the plurality of configuration files.

68. The tangible, computer-accessible storage medium as recited in claim 66, wherein executing the program instructions further causes the one or more computers to perform:
    configuring one or more of the plurality of software components included on the intelligent device using the batch configuration document;
    wherein, in said configuring, executing the program instructions further causes the one or more computers to perform applying the configuration information from the batch configuration document to one or more of the plurality of configuration files, wherein each of the one or more of the plurality of configuration files is associated with a respective one of the one or more of the plurality of software components of the intelligent device.

69. The tangible, computer-accessible storage medium as recited in claim 66, wherein the batch configuration document is a markup language document, wherein the markup language is eXtensible Markup Language (XML), and wherein the batch configuration document and the one or more configuration files conform to an XML Document Type Definition (DTD).

70. A tangible, computer-accessible storage medium storing program instructions that when executed on one or more computers cause the one or more computers to perform:
    accessing a batch configuration document, wherein the batch configuration document comprises configuration information for each of a plurality of software components included on an intelligent device and executable by a processor on the intelligent device, and wherein each of the plurality of software components is a different executable entity; and
    applying configuration information from the batch configuration document for each of one or more of the plurality of software components to a respective configuration file on the intelligent device, for each of the one or more of the plurality of software components included on the intelligent device to configure each of the one or more of the plurality of software components.

71. The tangible, computer-accessible storage medium as recited in claim 70, wherein, in said accessing the batch configuration document, executing the program instructions further causes the one or more computers to perform:
    generating a Document Object Model (DOM) tree from the batch configuration document, wherein the DOM tree includes the configuration information for the plurality of configuration files;
    wherein, in said applying the configuration information to the one or more configuration files, executing the program instructions further causes the one or more computers to perform accessing the configuration information from the DOM tree generated from the batch configuration document.

72. The tangible, computer-accessible storage medium as recited in claim 70, wherein the batch configuration document is a markup language document, wherein the markup language is eXtensible Markup Language (XML), and wherein the batch configuration document and the one or more configuration files conform to an XML Document Type Definition (DTD).

* * * * *